United States Patent
Ikeda et al.

(10) Patent No.: US 7,321,680 B2
(45) Date of Patent: Jan. 22, 2008

(54) GRAPHIC CONTOUR EXTRACTING METHOD, PATTERN INSPECTING METHOD, PROGRAM AND PATTERN INSPECTING SYSTEM

(75) Inventors: Takahiro Ikeda, Kanagawa (JP); Yumiko Miyano, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 448 days.

(21) Appl. No.: 10/807,188

(22) Filed: Mar. 24, 2004

(65) Prior Publication Data

US 2004/0181361 A1     Sep. 16, 2004

Related U.S. Application Data

(62) Division of application No. 10/188,889, filed on Jul. 5, 2002, now Pat. No. 6,772,089.

(30) Foreign Application Priority Data

Jul. 5, 2001     (JP)     ............................. 2001-204478

(51) Int. Cl.
*G06K 9/36* (2006.01)
*G06K 9/48* (2006.01)
*G06F 19/00* (2006.01)

(52) U.S. Cl. .................... 382/145; 382/241; 382/199; 700/187

(58) Field of Classification Search ................ 382/145, 382/242, 166, 178, 190, 199, 203, 241, 255, 382/266, 300, 305; 702/159; 249/16, 102, 249/104, 140, 35, 55, 99, 193, 192; 451/464, 451/466, 469, 490; 700/182, 187; 264/225, 264/254, 256, 35, 34, 338.33, 316, 259, 255, 264/245; 156/304.5
See application file for complete search history.

(56) References Cited

U.S. PATENT DOCUMENTS 4,804,831 A     2/1989     Baba et al.

(Continued)

FOREIGN PATENT DOCUMENTS

JP     7-27548     1/1995

(Continued)

*Primary Examiner*—Sheela Chawan
(74) *Attorney, Agent, or Firm*—Finnegan, Henderson, Farabow, Garrett & Dunner, L.L.P.

(57) ABSTRACT

A graphic contour extracting method includes: acquiring an image of a graphic form to be inspected; defining an inspection region for the image of the graphic form to be inspected by an inspection graphic form including at least one of a circle, an ellipse, a rectangle, a first rectangular graphic form, a second rectangular graphic form and a closed curved graphic form, at least one end of the first rectangular graphic form being replaced with any one of a semi-circle, a semi-ellipse and a parabola, at least one of four corners of the second rectangular graphic form being replaced with a ¼ circle or a ¼ ellipse, the closed curved graphic form being expressed by the following expression:

$$\frac{(x-x_0)^4}{a^4} + \frac{(y-y_0)^4}{b^4} = 1,$$

and the inspection graphic form having an edge searching direction previously defined for at least one component thereof; and searching an edge of the graphic form to be inspected on the basis of the inspection graphic form to acquire contour information of the graphic form to be inspected.

8 Claims, 26 Drawing Sheets

U.S. PATENT DOCUMENTS

| | | |
|---|---|---|
| 5,065,344 A | 11/1991 | Kishimoto et al. |
| 5,131,755 A * | 7/1992 | Chadwick et al. .......... 356/394 |
| 5,572,602 A | 11/1996 | Naoi et al. |
| 6,173,070 B1 | 1/2001 | Michael et al. |
| 6,263,089 B1 | 7/2001 | Otsuka et al. |
| 6,335,985 B1 | 1/2002 | Sambonsugi et al. |
| 6,480,807 B1 | 11/2002 | Miyano |
| 6,639,685 B1 * | 10/2003 | Gu et al. ..................... 356/603 |
| 6,774,905 B2 * | 8/2004 | Elfving et al. .............. 345/581 |
| 6,850,875 B1 * | 2/2005 | Claffey et al. ................. 703/6 |

FOREIGN PATENT DOCUMENTS

JP        2001-91231        4/2001

* cited by examiner

| | SHAPE OF ROI BOUNDARY | SEARCH DIRECTION |
|---|---|---|
| 220b | RECTANGLE |  |
| 220c | CIRCLE·ELLIPSE (ELLIPSE) | 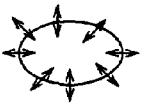 |
| 220d1 | RECTANGLE WITH ONE END REPLACED WITH SEMI-CIRCLE, SEMI-ELLIPSE OR PARABOLA (Capsule 1) |  |
| 220d2 | RECTANGLE WITH ONE END REPLACED WITH SEMI-CIRCLE, SEMI-ELLIPSE OR PARABOLA (Capsule 2) |  |
| 220d3 | RECTANGLE WITH BOTH ENDS REPLACED WITH SEMI-CIRCLE, SEMI-ELLIPSE OR PARABOLA (Capsule 3) | 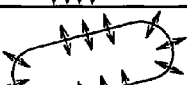 |
| 220d4 | RECTANGLE WITH BOTH ENDS REPLACED WITH SEMI-CIRCLE, SEMI-ELLIPSE OR PARABOLA (Capsule 4) | 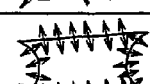 |
| 220e1 | RECTANGLE WITH ONE CORNER REPLACED WITH SEMI-CIRCLE, SEMI-ELLIPSES OR PARABOLA (Round 1) |  |
| 220e2 | RECTANGLE WITH TWO CORNERS REPLACED WITH SEMI-CIRCLES, SEMI-ELLIPSES OR PARABOLAS (Round 2) | 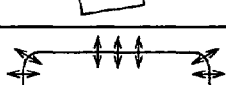 |
| 220e3 | RECTANGLE WITH THREE CORNERS REPLACED WITH SEMI-CIRCLES, SEMI-ELLIPSES OR PARABOLAS (Round 3) |  |
| 220e4 | RECTANGLE WITH FOUR CORNERS REPLACED WITH SEMI-CIRCLES, SEMI-ELLIPSES OR PARABOLAS (Round 4) | 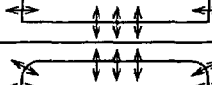 |
| 220f | POTENTIAL CURVE | (DIRECTION ALONG CURVE) |

FIG. 3

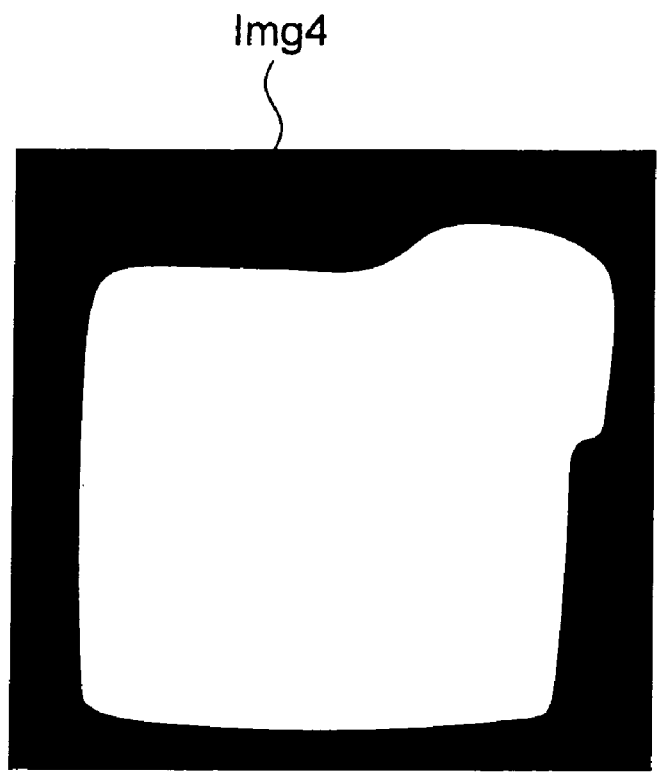
FIG. 15
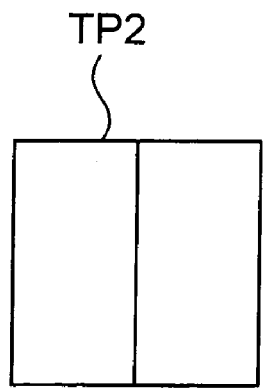 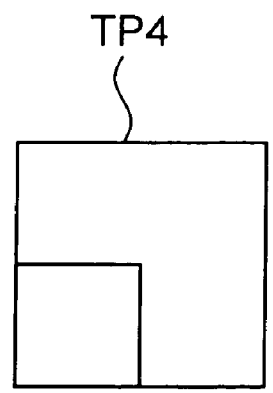 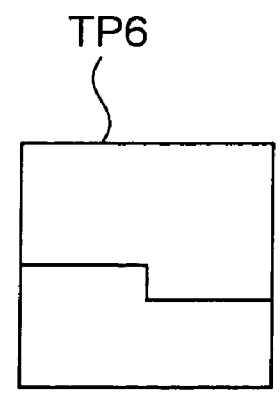
FIG. 16A    FIG. 16B    FIG. 16C

TP12

GRAPHIC CONTOUR EXTRACTING METHOD, PATTERN INSPECTING METHOD, PROGRAM AND PATTERN INSPECTING SYSTEM

This is a division of application Ser. No. 10/188,889, filed Jul. 5, 2002, which is incorporated herein by reference.

CROSS REFERENCE TO RELATED APPLICATION

This application claims benefit of priority under 35USC § 119 to Japanese patent application No. 2001-204478, filed on Jul. 5, 2001, the contents of which are incorporated by reference herein.

BACKGROUND OF THE INVENTION

1. Field of the Invention

The present invention generally relates to a graphic contour extracting method, a pattern inspecting method, a program and a pattern inspecting system.

2. Description of the Prior Art

In a process of inspection in a semiconductor manufacturing process, image data of a pattern to be inspected are often acquired by an electron microscope, an optical microscope, a charge coupled device (CCD) or the like, to utilize contour information on the pattern to be inspected which is extracted on the basis of the image data. As contour information extracting methods, various methods have been put to practical use. For example, such methods include a method for setting a predetermined density value as a threshold value to define a portion corresponding to the threshold value as an edge when an acquired pattern image is a variable density image, a method for comparing an acquired pattern image with a closed curve graphic form serving as a reference, and a method for detecting a pattern edge by means of a two-dimensional filter, such as a Sobel filter.

Generally, when such a process is carried out, a region of interest (ROI) is assigned to a region of interest in an obtained image, and an edge extracting algorithm for executing any one of the above described various methods is executed in the interior of the assigned region to acquire a sequence of coordinate points of an edge corresponding to contour information to calculate geometric characteristic amounts, such as a line width, an area and a position of center of gravity, from data with respect to the obtained sequence of coordinate points.

As a shape of a boundary for defining an ROI region (an ROI boundary), a rectangle, an ellipse or a circle is often adopted for convenience of definition of the region. A method for assigning a rectangular ROI region is most generally carried out. An example of a method for adopting an elliptical ROI region is disclosed in e.g. Japanese Patent Laid-Open No. 2001-091231.

When the rectangular ROI boundary is adopted in the prior art, a pattern edge is searched in a direction parallel to any one of sides of an ROI region 62 as shown in, e.g., FIG. 27. Such a method is used when a pattern edge is substantially straight like a pattern P50 shown in the figure.

With respect to a pattern having a closed curved contour, an elliptical (or a circle) ROI boundary is set so as to surround a pattern edge of the pattern (P52) as shown by, e.g., an ROI boundary 64b in FIG. 28, and a pattern edge is searched in a direction of a radius vector.

However, in an image of a semiconductor pattern, the two-dimensional shape of a body serving as an object is more complicated. Therefore, in an inspecting method in the prior art, there are some cases where an edge searching direction is parallel to a pattern edge. For example, in the prior art, in the case of a pattern P2 shown in FIG. 29A, a pattern edge is locally parallel to an edge searching direction in a region Ep2 which includes an end of the pattern p2. In such a case, an edge point to be extracted has multi-values, so that there is a problem in that it is not possible to extract a proper edge position. Even with respect to a pattern having a closed curved contour, there may be regions Ep4, Ep6, Ep8 and Ep10 wherein pattern edges are parallel to edge searching directions (directions of radius vectors) as shown by a pattern P4 in FIG. 30A. In these cases, a tester must set a plurality of ROIs in accordance with the complexity of the pattern as shown by an ROI 68 in FIG. 29B and ROIs 74a through 74g in FIG. 30B, respectively, so that the costs required for inspection are increased. In particular, there are some cases where patterns to be inspected in fact have more complicated contour shapes as shown by patterns P6 and P8 in FIGS. 31 and 32, respectively. For example, with respect to the pattern P6 shown in FIG. 31, the edge searching direction locally corresponds to approximate directions of pattern edges at two portions (regions Ep12 and Ep14), so that there is a problem in that the tester fails in searching for edge positions in such portions. In the pattern P8 shown in FIG. 32, an elliptical ROI boundary 78b is set for searching edges in directions of its radius vectors. Therefore, the edge searching directions substantially corresponds to directions of pattern edges in regions Ep16 through Ep30, so that there is a problem in that the tester fails in searching for edge positions.

In addition, even if a pattern has a substantially straight pattern edge, when end portions of two patterns P10 and P12 face each other as shown in, e.g., FIG. 33, or when pattern edges of two close line patterns are perpendicular to each other as shown by patterns P14 and P18 in FIG. 34, there is a problem in that an edge searching direction substantially corresponds to directions of edges of a line pattern (P14) at two portions if search is carried out in a lateral direction on the figure.

Moreover, as shown by an example of a scanning electron microscope (SEM) image in FIG. 35, there are some cases where an OPC pattern called a serif is given to a part of a pattern on a reticle. In the case of a pattern P64 shown in this figure, it is not possible to detect edges in a contour portion parallel to an edge searching direction in, e.g., a region Ep32. There is also a problem in that a plurality of candidates of proposed edge points with respect to a single edge searching direction are detected in a region Ep34 in the figure. In addition, there are some cases where an edge is extracted in a direction which is not perpendicular to the contour of the pattern as shown in a region Ep36 in the figure. A density variation PF2 of the image in the edge searching direction in this case is shown in FIG. 36A. Furthermore, FIG. 36B shows the density variation PF4 of the image when edge searching is carried out in a direction substantially perpendicular to the contour of the pattern. As can be clearly seen from the comparison of both figures with each other, when the edge searching direction is not perpendicular to the contour of the pattern, the waveform of density variation is rendered broader, so that it is easy to include noises. That is, it can be seen that errors are apt to generate in edge detection.

In order to eliminate these problems, for example, the above described Japanese Patent Laid-Open No. 2001-

091231 discloses a method for preparing a graphic form exhibiting characteristics of a pattern and for searching edges in a direction perpendicular to the graphic form to acquire contour data. However, it takes a lot of processing time to calculate searching directions for all of sequences of edge points. In addition, when the prepared graphic form exhibiting characteristics of the pattern includes many edges, there is a problem in that it is not possible to skillfully search edges due to the influence of noises which generate from the edges of the prepared graphic form.

Also in the case of the above described threshold method for extracting contour information on the basis of a threshold value, there are following problems in accordance with a pattern to be inspected. For example, if the maximum value (peak) of density in an ROI is set to be 100% and the minimum value (bottom) is set to be 0%, and if a position having a predetermined threshold value (e.g., 50%) is detected as an edge, the peak and bottom positions of a signal waveform in an edge searching direction are clear as shown by, e.g., a density variation (signal waveform) PF6 in FIG. 37A, in a pattern wherein an edge portion perpendicular to a substrate is formed. Therefore, if the ROI is set so as to include the peak and bottom, it is possible to stably detect an edge by the threshold method. However, in the case of a pattern having a taper or the like, there are some cases where the bottom position is not clear as shown by PF8 in FIG. 37B. Therefore, as shown in the comparison of ROI 84 with ROI 86 in FIG. 37B, if the position of an ROI boundary varies, the position of 0% is shifted, so that the position of the edge is shifted to cause a problem in that the result of measurement includes errors.

BRIEF SUMMARY OF THE INVENTION

According to a first aspect of the present invention, there is provided a graphic contour extracting method comprising: acquiring an image of a graphic form to be inspected; defining an inspection region for the image of the graphic form to be inspected by an inspection graphic form including at least one of a circle, an ellipse, a rectangle, a first rectangular graphic form, a second rectangular graphic form and a closed curved graphic form, at least one end of the first rectangular graphic form being replaced with any one of a semi-circle, a semi-ellipse and a parabola, at least one of four corners of the second rectangular graphic form being replaced with a ¼ circle or a ¼ ellipse, the closed curved graphic form being expressed by the following expression:

$$\frac{(x-x_0)^4}{a^4} + \frac{(y-y_0)^4}{b^4} = 1,$$

and the inspection graphic form having an edge searching direction previously defined for at least one component thereof; and searching an edge of the graphic form to be inspected on the basis of the inspection graphic form to acquire contour information of the graphic form to be inspected.

According to a second aspect of the present invention, there is provided a graphic contour extracting method comprising: acquiring an image of a graphical form to be inspected; defining a potential function V for the image of the graphical form; calculating a first group of curves which are formed by connecting equal values with respect to values expressed by the potential function V; calculating a second group of curves which are substantially perpendicular to the first group of curves; and searching a contour of the graphical form along the second group of curves to acquire contour information of the graphical form.

According to a third aspect of the present invention, there is provided a graphic contour extracting method comprising: acquiring an image of a graphical form to be inspected, the image being constituted by pixels; preparing a polygonal line having a shape approximating the shape of the graphical form; determining an edge searching direction on the basis of the polygonal line; and analyzing a density distribution of the pixels of the image in the edge searching direction to detect coordinates of an edge point of the graphical form.

According to a fourth aspect of the present invention, there is provided a pattern inspecting method comprising: acquiring an image of a pattern to be inspected; defining an inspection region for the pattern by an inspection graphic form including at least one of a circle, an ellipse, a rectangle, a first rectangular graphic form, a second rectangular graphic form and a closed curved graphic form, at least one end of the first rectangular graphic form being replaced with any one of a semi-circle, a semi-ellipse and a parabola, at least one of four corners of the second rectangular graphic form being replaced with a ¼ circle or a ¼ ellipse, the closed curved graphic form being expressed by the following expression:

$$\frac{(x-x_0)^4}{a^4} + \frac{(y-y_0)^4}{b^4} = 1,$$

and the inspection graphic form having an edge searching direction previously defined for at least one component thereof; and searching an edge of the pattern on the basis of the inspection graphic form to acquire contour information of the pattern.

According to a fifth aspect of the present invention, there is provided a pattern inspecting method comprising: acquiring an image of a pattern to be inspected; defining a potential function V for the image of the pattern; calculating a first group of curves which are formed by connecting equal values with respect to values expressed by the potential function V; calculating a second group of curves which are substantially perpendicular to the first group of curves; and searching a contour of the pattern along the second group of curves to acquire contour information of the pattern.

According to a sixth aspect of the present invention, there is provided a pattern inspecting method comprising: acquiring an image of a pattern to be inspected, the image being constituted by pixels; preparing a polygonal line having a shape approximating the shape of the pattern; determining an edge searching direction on the basis of the polygonal line; and analyzing a density distribution of the pixels of the image in the edge searching direction to detect coordinates of an edge point of the pattern.

According to a seventh aspect of the present invention, there is provided a program for causing a computer to execute a graphic contour extracting method, the method comprising: acquiring an image of a graphic form to be inspected; defining an inspection region for the image of the graphic form to be inspected by an inspection graphic form including at least one of a circle, an ellipse, a rectangle, a first rectangular graphic form, a second rectangular graphic form and a closed curved graphic form, at least one end of the first rectangular graphic form being replaced with any-one of a semi-circle, a semi-ellipse and a parabola, at least one of four corners of the second rectangular graphic form being replaced with a ¼ circle or a ¼ ellipse, the closed curved graphic form being expressed by the following expression:

$$\frac{(x-x_0)^4}{a^4} + \frac{(y-y_0)^4}{b^4} = 1,$$

and the inspection graphic form having an edge searching direction previously defined for at least one component thereof; and searching an edge of the graphic form to be inspected on the basis of the inspection graphic form to acquire contour information of the graphic form to be inspected.

According to an eighth aspect of the present invention, there is provided a program for causing a computer to execute a graphic contour extracting method, the method comprising: acquiring an image of a graphical form to be inspected; defining a potential function V for the image of the graphical form; calculating a first group of curves which are formed by connecting equal values with respect to values expressed by the potential function V; calculating a second group of curves which are substantially perpendicular to the first group of curves; and searching a contour of the graphical form along the second group of curves to acquire contour information of the graphical form.

According to a ninth aspect of the present invention, there is provided a program for causing a computer to execute a graphic contour extracting method, the method comprising: acquiring an image of a graphical form to be inspected, the image being constituted by pixels; preparing a polygonal line having a shape approximating the shape of the graphical form; determining an edge searching direction on the basis of the polygonal line; and analyzing a density distribution of the pixels of the image in the edge searching direction to detect coordinates of an edge point of the graphical form.

According to a tenth aspect of the present invention, there is provided a program for causing a computer to execute a pattern inspecting method, the method comprising: acquiring an image of a pattern to be inspected; defining an inspection region for the pattern by an inspection graphic form including at least one of a circle, an ellipse, a rectangle, a first rectangular graphic form, a second rectangular graphic form and a closed curved graphic form, at least one end of the first rectangular graphic form being replaced with any one of a semi-circle, a semi-ellipse and a parabola, at least one of four corners of the second rectangular graphic form being replaced with a ¼ circle or a ¼ ellipse, the closed curved graphic form being expressed by the following expression:

$$\frac{(x-x_0)^4}{a^4} + \frac{(y-y_0)^4}{b^4} = 1,$$

and the inspection graphic form having an edge searching direction previously defined for at least one component thereof; and searching an edge of the pattern on the basis of the inspection graphic form to acquire contour information of the pattern.

According to an eleventh aspect of the present invention, there is provided a program for causing a computer to execute a pattern inspecting method, the method comprising: acquiring an image of a pattern to be inspected; defining a potential function V for the image of the pattern; calculating a first group of curves which are formed by connecting equal values with respect to values expressed by the potential function V; calculating a second group of curves which are substantially perpendicular to the first group of curves; and searching a contour of the pattern along the second group of curves to acquire contour information of the pattern.

According to a twelfth aspect of the present invention, there is provided a program for causing a computer to execute a pattern inspecting method, the method comprising: acquiring an image of a pattern to be inspected, the image being constituted by pixels; preparing a polygonal line having a shape approximating the shape of the pattern; determining an edge searching direction on the basis of the polygonal line; and analyzing a density distribution of the pixels of the image in the edge searching direction to detect coordinates of an edge point of the pattern.

According to a thirteenth aspect of the present invention, there is provided a pattern inspecting system comprising: an image acquiring part which acquires an image of a pattern to be inspected; an inspection region defining part which defines an inspection region for the pattern by preparing an inspection graphic form including at least one of a circle, an ellipse, a rectangle, a first rectangular graphic form, a second rectangular graphic form and a closed curved graphic form, at least one end of the first rectangular graphic form being replaced with any one of a semi-circle, a semi-ellipse and a parabola, at least one of four corners of the second rectangular graphic form being replaced with a ¼ circle or a ¼ ellipse, the closed curved graphic form being expressed by the following expression:

$$\frac{(x-x_0)^4}{a^4} + \frac{(y-y_0)^4}{b^4} = 1,$$

and the inspection graphic form having an edge searching direction previously defined for at least one component thereof; and a contour extracting part which searches an edge of the pattern on the basis of the inspection graphic form to acquire contour information of the pattern.

According to a fourteenth aspect of the present invention, there is provided a pattern inspecting system comprising: an image acquiring part which acquires an image of a pattern to be inspected; a calculating part which defines a potential function V for the image of the pattern, calculates a first group of curves which are formed by connecting equal values with respect to values expressed by the potential function V, and calculates a second group of curves which are substantially perpendicular to the first group of curves; and a contour extracting part which searches a contour of the pattern along the second group of curves to acquire contour information of the pattern.

According to a fifteenth aspect of the present invention, there is provided a pattern inspecting system comprising: an image acquiring part which acquires an image of a pattern to be inspected, the image being constituted by pixels; a polygonal line preparing part which prepares a polygonal line having a shape approximating the shape of the pattern; an edge searching direction determining part which determines an edge searching direction on the basis of the polygonal line; and a contour extracting part which analyzes a density distribution of the pixels in the edge searching direction to detect coordinates of an edge point of the pattern.

BRIEF DESCRIPTION OF THE DRAWINGS

In the accompanying drawings:

FIG. 3 shows a list of ROI boundary shapes which can be called out by a pull-down menu shown in FIG. 2;

FIGS. 14 and 15 are schematic diagrams for explaining the pattern inspecting method shown in FIG. 12;

FIGS. 16A through 16C are diagrams showing examples of a template for use in the pattern inspecting method shown in FIG. 12;

DETAILED DESCRIPTION OF THE INVENTION

Referring now to the accompanying drawings, some embodiments of the present invention will be described below. As for an embodiment of a graphic contour extracting method, it will be explained in a pattern inspecting method which uses the graphic contour extracting method.

(1) First Embodiment of Pattern Inspecting System

Figure 1:
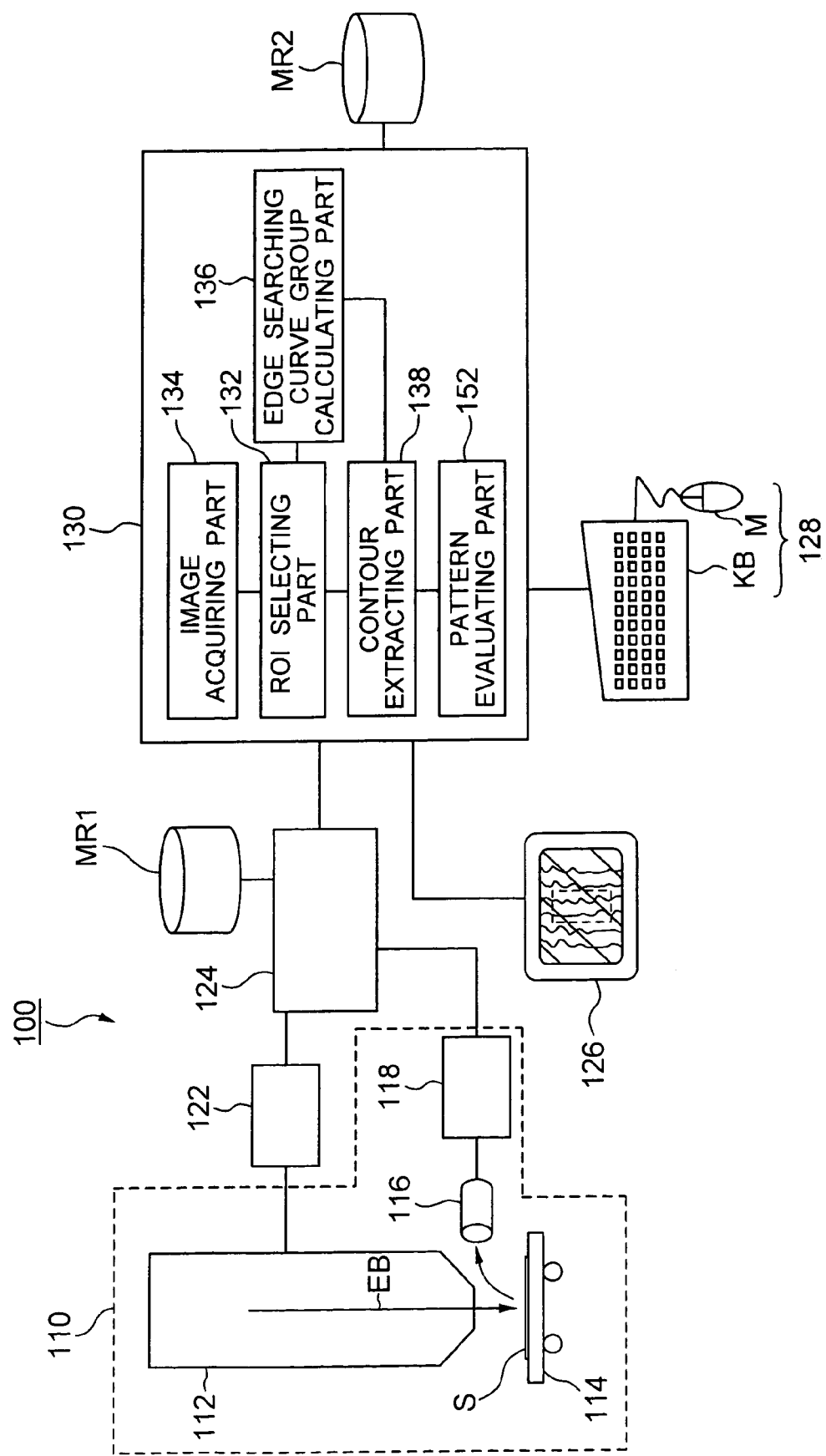
FIG. 1 is a block diagram showing a first embodiment of a pattern inspecting system according to the present invention.

FIG. 1 is a block diagram showing the first embodiment of a pattern inspecting system according to the present invention. A pattern inspecting system 100 shown in this figure comprises a SEM unit 110, an electronic optical system control part 122, a host computer 124, memories MR1 and MR2, an image processing unit 130, a display part 126 and an input part 128.

The SEM unit 110 includes a stage 114 for mounting thereon a substrate S, an electronic optical system 112, a secondary electron detector 116 and a signal processing part 118. The electronic optical system 112 is designed to generate an electron beam EB in accordance with a control signal supplied from the electronic optical system control part 122 to irradiate the substrate S with the electron beam EB. On the substrate S, a fine pattern serving as an object to be inspected is formed. The secondary electron detector 116 is designed to detect a secondary electron/a reflected electron/a back scattering electron which are emitted from the surface of the substrate S by the irradiation with the electron beam EB. The signal processing part 118 is designed to convert an analog picture signal, which comprises the secondary electron/reflected electron/back scattering electron detected by the secondary electron detector 116, to a digital signal and amplifies the digital signal to supply the amplified digital signal to the host computer 124.

The host computer 124 is designed to control the whole system in accordance with a recipe file stored in the memory MR1, to supply a control signal to the electronic optical system control part 122 and to process the digital signal supplied from the signal processing part 118 to output a picture signal which will be a SEM image indicative of the state of the surface of the pattern.

The image processing unit 130 includes an image acquiring part 132, an ROI selecting part 134, an edge searching curve group calculating part 136, a contour extracting part 138 and a pattern evaluating part 152. The image acquiring part 132 is designed to acquire image data of a pattern to be inspected which is obtained by the SEM unit 110 via the host computer 124. The ROI selecting part 134 is designed to define an ROI boundary of the pattern to be inspected by a procedure which will be described later. Each of ROI boundaries have an edge searching direction which is previously defined respectively. The contour extracting part 138 is designed to search an edge in a previously defined searching direction toward the interior of the ROI boundary from a pixel on the ROI boundary defined by the ROI selecting part 134 and to acquire coordinates of edge points of the pattern to be inspected. The pattern evaluating part 152 is designed to calculate the dimension, area, edge roughness, perimeter, round extent and so fourth of a target pattern on the basis of the obtained contour information and to inspect the pattern on the basis of these amounts which represent the characteristics of the pattern.

The input part 128 includes a key board KB and a mouse M, and is connected to the image processing unit 130 to provide the image processing unit 130 with a signal to be processed which is input by an operator.

The display part 126 is connected to the image processing unit 130 for displaying a SEM image, an image processing GUI and various graphic forms superposed on the SEM image.

Figure 2:
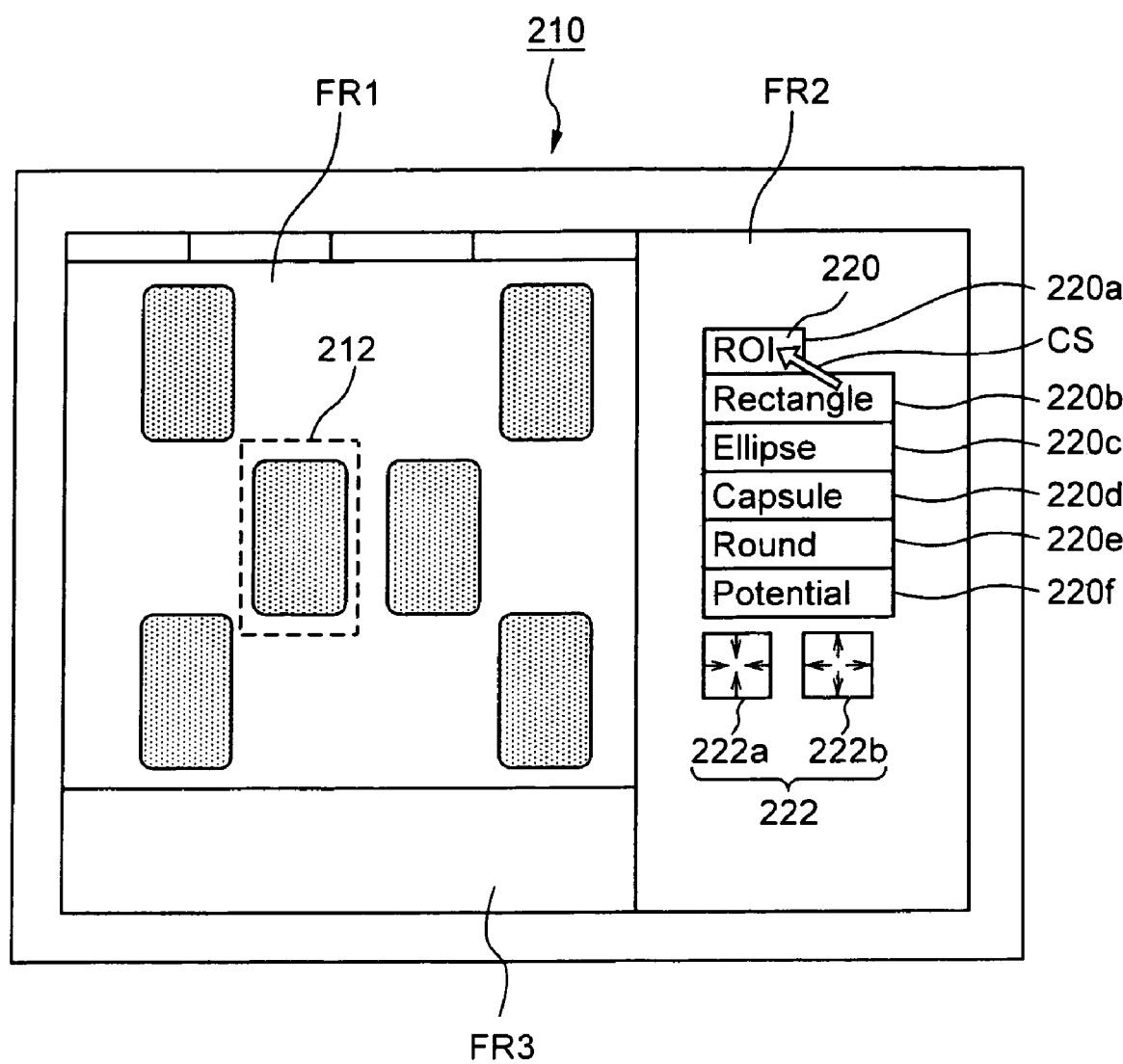
FIG. 2 is a diagram showing an example of a display screen of a display part of the pattern inspecting system shown in FIG. 1.

An example of a display screen of the display part 126 is shown in FIG. 2. In the example shown in this figure, the display screen is divided into a plurality of frames FR1 through FR3, the SEM image of a pattern to be inspected is displayed on the first frame FR1 and an ROI shape selecting part 220 and an edge search direction assigning part 222 are displayed on the second frame FR2. A plurality of images of patterns to be inspected are displayed on the display screen 210, and a rectangular ROI 212 is set to one of the images. In the ROI shape selecting part 220, an ROI shape selecting button 220a and pull-down menus 220b through 220f are shown with names of boundary shapes serving as candidates to be selected. The edge search direction assigning part 222 includes a button 222a for assigning search toward the interior of the ROI boundary and a button 222b for assigning search toward the outside of the ROI boundary.

FIG. 3 shows a list of ROI boundary shapes (candidate graphic forms) capable of being called out by the pull-down menus 220b through 220f. In the Rectangle 220b, there are shown two rectangular shapes capable of being searched in X and Y directions, respectively. In the Ellipse 220c, a circular or elliptical ROI boundary shape is shown. In the rectangles (Capsule 1-4) 220d1 through 220d4 four kinds of ROI boundaries are shown, each of the ROI boundaries has a semi-circular, semi-elliptical or parabolic shape on one of their ends. Each of the Capsules 1 and 2 is a rectangle with one end replaced with a semi-circular, semi-elliptical or parabolic shape. The Capsules 1 is a rectangle wherein a semi-circle, semi-ellipse or parabola is arranged so as to expand outwardly from one end of the rectangle, and the Capsule 2 is a rectangle wherein a semi-circle, semi-ellipse or parabola is arranged so as to extend inwardly from its one end as if the end of the rectangle is cut out. Each of the Capsules 3 and 4 is rectangle with both ends replaced with semi-circular, semi-elliptical or parabolic shapes. Similar to the Capsules 1 and 2, the Capsule 3 is a rectangle wherein a semi-circle, semi-ellipse or parabola is arranged so as to expand outwardly from both ends of the rectangle, and the Capsule 4 is a rectangle wherein semi-circles, semi-ellipses or parabolas are arranged so as to extend inwardly from both ends of the rectangle as if the rectangle itself is cut out. The rectangles (Round) 220e1 through 220e4 having a ¼ elliptical or circular corner include rectangles (Rounds 1 through 4) wherein one corner through four corners are in shape of ¼ elliptical or circular, respectively. The curve (Potential) 220f is a button for assigning calculation of an edge searching curve group, and the details thereof will be described later.

As the first through seventh embodiments of a pattern inspecting method according to the present invention, the operation of the pattern inspecting system 100 shown in FIG. R will be described bellow.

(2) First Embodiment of Pattern Inspecting Method

The first embodiment of a pattern inspecting method according to the present invention will be described below. This embodiment is intended to eliminate the problem described with respect to the region Ep2 in FIG. 29A.

Figure 29A:
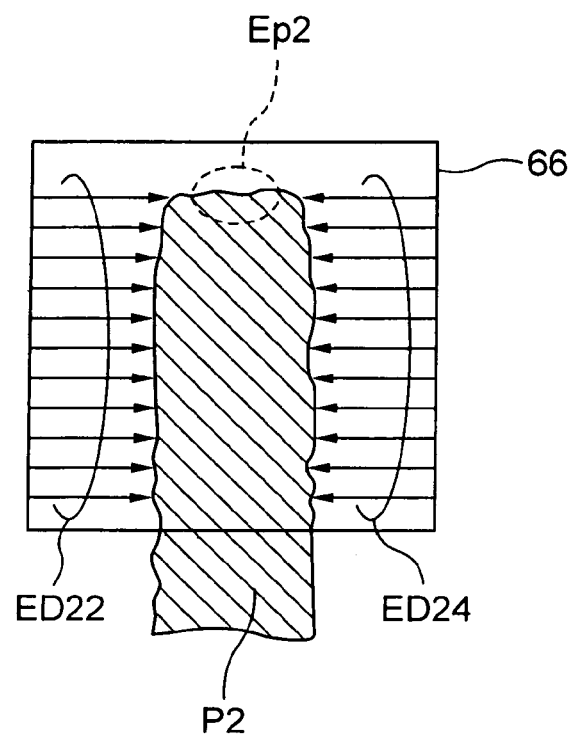
FIGS. 29A through 35 are schematic diagrams for explaining problems in the prior art.
Figure 29B:
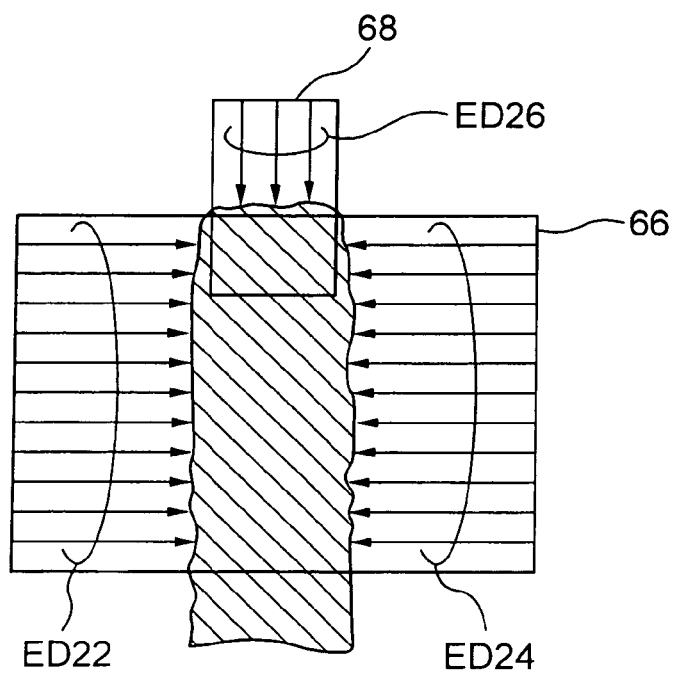

While the semiconductor device pattern P2 shown in FIG. 29A has been designed at a design stage so as to have a substantially rectangular shape, the corner portions of the shape is modulated so as to be round after a lithography process. Therefore, in this embodiment, as shown in FIG. 4C, the shape of an ROI boundary is defined as a rectangle wherein two of four corners are replaced with ¼ ellipses.

That is, image data of the pattern P2 to be inspected are incorporated into the image acquiring part 132 of the image processing unit 130 from the SEM unit 110 via the host computer 124 and the display screen 210 (see FIG. 2) of the display part 126 displays the incorporated image data.

Figure 4A:
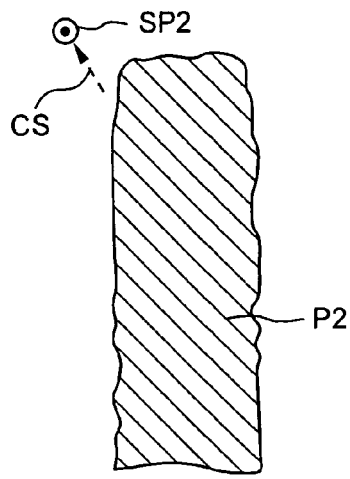
FIGS. 4A through 4E are schematic diagrams for explaining a first embodiment of a pattern inspecting method according to the present invention.
Figure 4B:
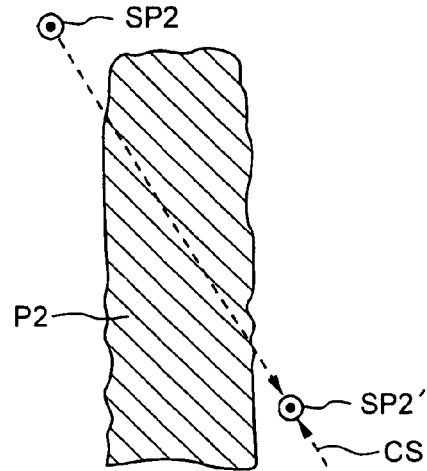
Figure 4C:
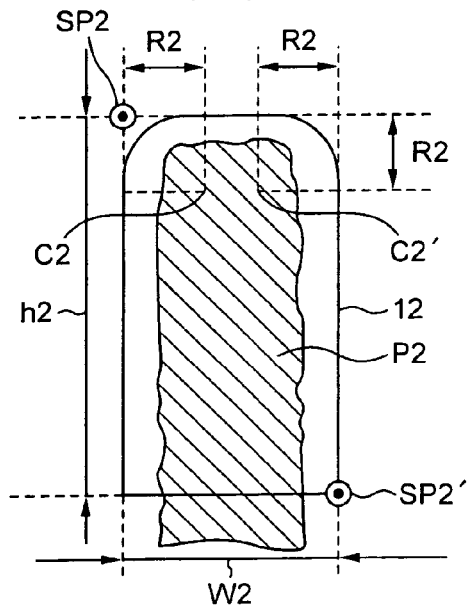
Figure 4D:
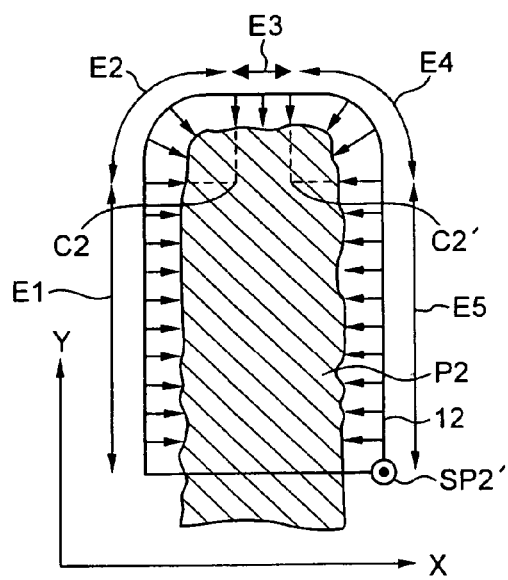

Then, with respect to the displayed image, as shown in FIG. 4A, a mouse cursor CS is moved to an arbitrary position SP2 near an edge portion of the pattern P2 on the display screen 210, and the mouse M is clicked to assign the reference point SP2 near and on the left side above the pattern P2. Then, as shown in FIG. 4B, the mouse cursor CS is dragged to a position SP2' at the right-bottom corner of a desired region to be inspected so as to set a diagonal of a rectangle to define the size of the inspection region.

Then, a pull-down menu is drawn out from the ROI shape selecting part 220 in the display screen 210 (the second frame FR2) to select the Capsule button 220d and the button 220d1 of the Capsules 1 (see FIG. 3) is selected from the displayed Capsules 1 through 4. Thus, as shown in FIG. 4C, an ROI boundary 12 having a rectangular shape wherein a line drawn between the reference points SP2 and SP2' would be its diagonal and where in upper two corners of a rectangular boundary are replaced with ¼ circles is set. In this embodiment, the radius R2 of the ¼ circle was determined with respect to a width w2 between the SP2 and SP2' so as to satisfy the following expression:

$$\text{Radius } R2 = (w/2)/1.618 \text{ (golden section ratio)} \tag{1}$$

and central positions c2 and c2' were determined by a numerical calculation so that both ends of the ¼ circle contact sides of the original rectangular boundary. Thus, the shape of the ROI boundary 12 can be completely determined only by assigning the reference points SP2 and SP2' by means of the mouse M or the like.

Then, an edge searching direction toward the interior of the ROI boundary 12 is assigned by selecting, e.g., the button 222a, from the two buttons of the edge search direction assigning part 222 (see FIG. 2). Thus, the contour extracting part 138 of the image processing unit 130 searches edges from pixels on the ROI boundary 12 toward the interior of the ROI boundary 12 by, e.g., the following procedures.

E1: direction from ROI boundary 12 and parallel to X-axis
E2: direction from ROI boundary 12 toward center C2 of ¼ circle
E3: direction parallel to Y-axis from ROI boundary 12
E4: direction from ROI boundary 12 toward center C2' of ¼ circle
E5: direction from ROI boundary 12 and parallel to X-axis In the edge search in this embodiment, the density of a pixel was examined with respect to each searching direction, and the coordinates of the outermost position of positions where in the density was 50% of the maximum and minimum values were defined as coordinates of an edge point.

By means of the above described method, it is possible to prevent the failure in extraction of an edge in the region Ep2 of FIG. 29A.

While the ROI boundary has been defined by reading the position of the mouse cursor CS on the image in this embodiment, the positions of SP2 and SP2' may be previously stored as data in the memory M2 of the pattern inspecting system 100 to read the data prior to inspection to produce ROI as described above.

While the corner of the rectangular region has been replaced with the ¼ circle in this embodiment, this may be a ¼ ellipse. The proportion of the major/minor axis of the ellipse or the radius of the circle to the size of the rectangular region should not be limited to the above described golden section ratio, it may be suitably changed. Alternatively, a curve expressed by the following expression may be used as a similar closed curve.

$$\frac{(x-x_0)^4}{a^4} + \frac{(y-y_0)^4}{b^4} = 1 \quad (2)$$

Figure 4E:
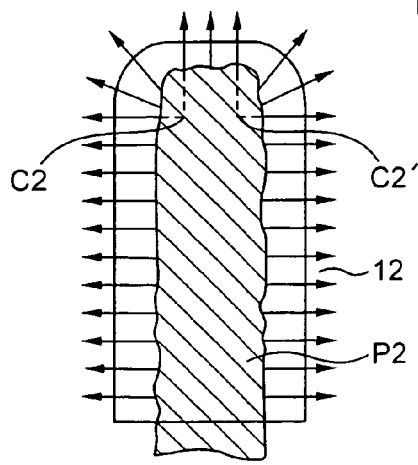

While the edge has been searched toward the interior of the ROI boundary 12, the edge may be searched outwardly from the interior of the ROI boundary 12 as shown in FIG. 4E by selecting the button 222b of the edge search direction assigning part 222.

Moreover, while the threshold method has been adopted as the method for determining the coordinates of edge points in this embodiment, it should not be limited thereto, but it may be suitably changed in accordance with the state of the edge. That is, with respect to a roof edge image, the position of the peak may be defined as the position of an edge, and with respect to a step edge image, the differential/secondary differential of a density value may be calculated in a searching direction to determine that the coordinates of a position which provides the maximum absolute value are coordinates of edge points. Of course, it may be used with various two-dimensional filters. These points are the same in the second through sixth embodiments which will be described below.

(3) Second Embodiment of Pattern Inspecting Method

Figure 5A:
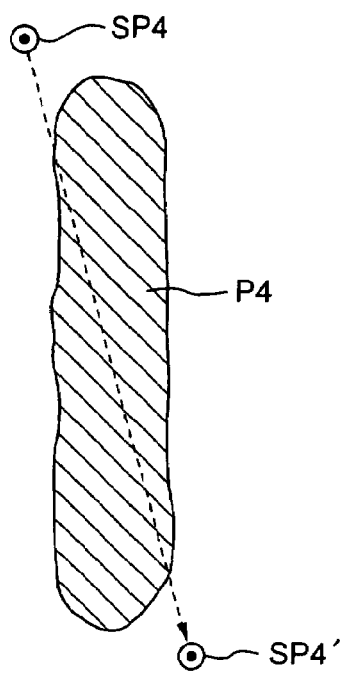
FIGS. 5A through 5C are schematic diagrams for explaining a second embodiment of a pattern inspecting method according to the present invention.
Figure 5B:
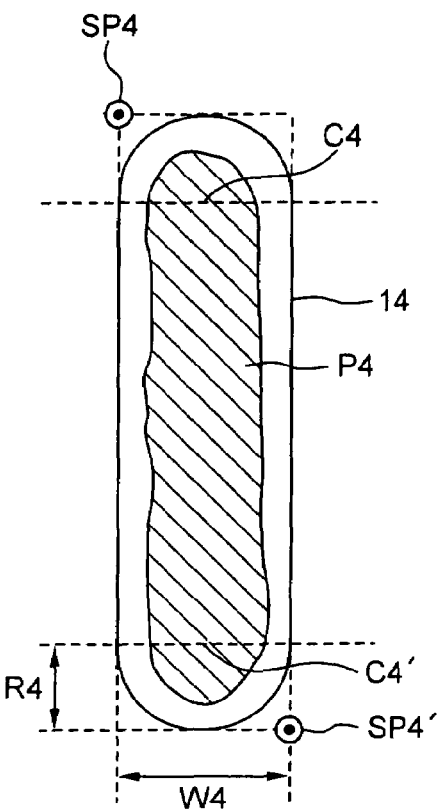
Figure 5C:
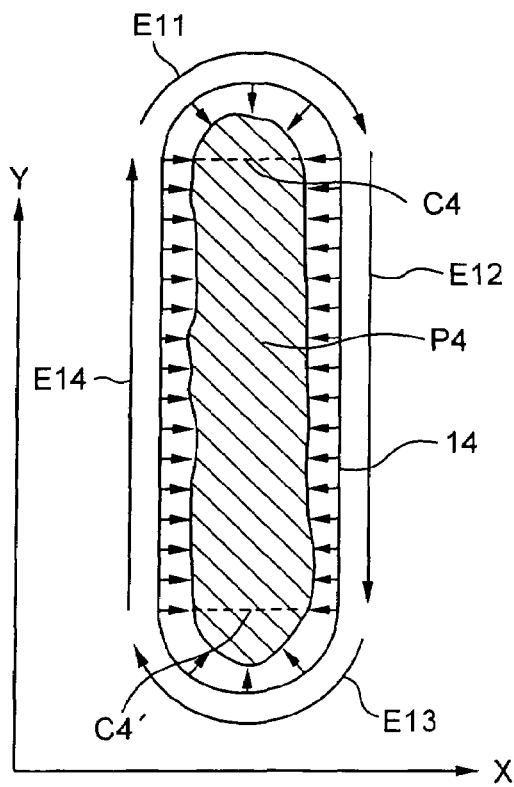

Referring to FIGS. 5A through 5C, the second embodiment of a pattern inspecting method according to the present invention will be described below. This embodiment is intended to eliminate the problems described with respect to the regions Ep4, Ep6, Ep8 and Ep10 in FIG. 30A.

In this embodiment, the shape of an ROI boundary was defined by a graphic form wherein both ends of a rectangle are replaced with semi-circles (Capsules 3 in FIG. 3).

That is, at first, image data of the pattern P4 to be inspected are acquired from the SEM unit 110 via the host computer 124 to be incorporated into the image acquiring part 132 of the image processing unit 130 and the image is displayed on the display part 126.

Then, with respect to the displayed pattern P4, as shown in FIG. 5A, the mouse cursor CS was moved to an arbitrary position above the left side of the pattern P4 on the display screen 210 of the display part 126 and the mouse M was clicked to assign the reference point SP4. Then, the mouse cursor CS was dragged to a position SP4' at the right-bottom corner of a region to be inspected.

Then, a pull-down menu is drawn out from the ROI shape selecting part 220 on the display screen 210 (the second frame FR2) to select the Capsule button 220d and the button 220d3 of the Capsule 3 (see FIG. 3) is selected from the displayed Capsules 1 through 4. Thus, as shown in FIG. 5B, upper and lower two sides of a rectangular boundary determined by the reference points SP4 and SP4' are replaced with semi-circles to set an ROI boundary 14. In this embodiment, the radius R4 of the semicircle was defined so as to be w4/2 with respect to a width w4 between the SP4 and SP4'. Thus, the shape of the ROI boundary 14 can be easily determined only by assigning the SP4 and SP4' by means of the mouse M.

Then, an edge searching direction is assigned by selecting, e.g., the button 222a, from the two buttons of the edge search direction assigning part 222 (see FIG. 2). Thus, the contour extracting part 138 of the image processing unit 130 searches edges from pixels on the ROI boundary 14 toward the interior of the ROI boundary 14 by, e.g., the following procedures.

E11: direction from ROI boundary 14 toward center C4
E12: direction from ROI boundary 14 and parallel to X-axis
E13: direction from ROI boundary 14 toward center C4'
E14: direction from ROI boundary 14 and parallel to X-axis Also in this embodiment, the density of a pixel was examined with respect to each searching direction, and the coordinates of the outermost position of positions wherein the density was 50% of the maximum and minimum values were defined as coordinates of an edge point.

Figure 30A:
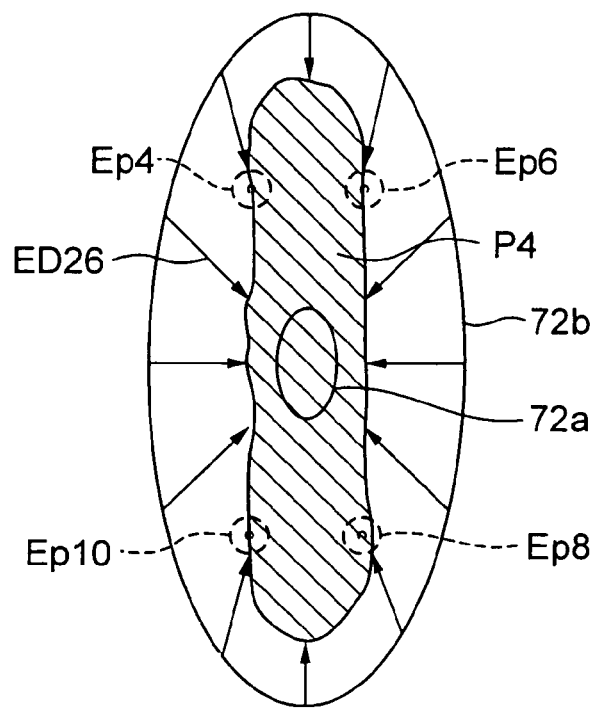
Figure 30B:
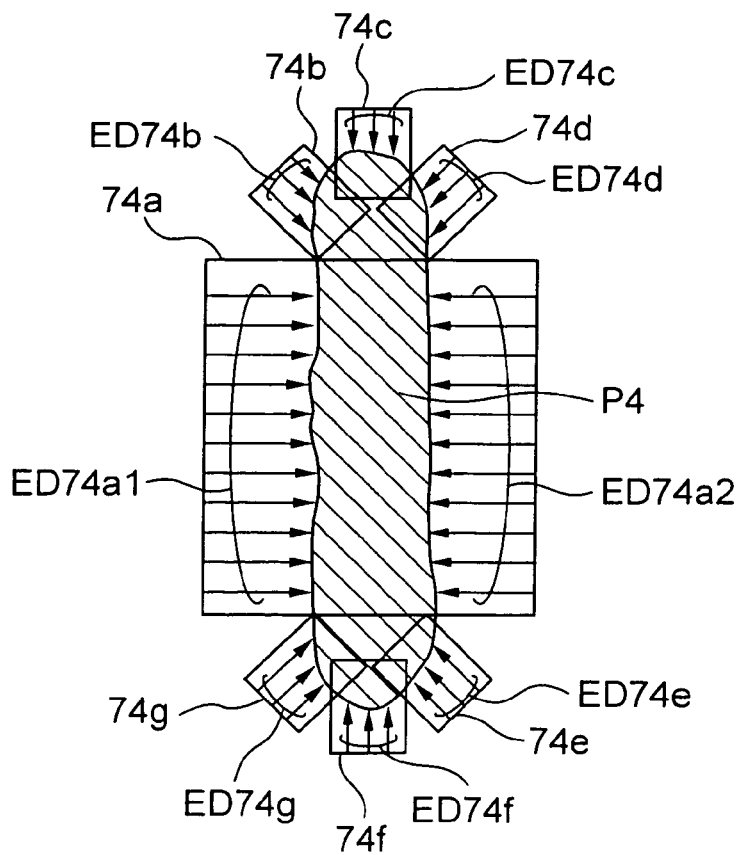

By means of the above described method, it is possible to prevent the failure in extraction of edges in the regions Ep4, Ep6, Ep8 and Ep10 of FIG. 30A.

Furthermore, also in this embodiment, the selection of the shape and size of the corner portion of the ROI boundary, the change of inside and outside of the boundary region in the edge search, and the method for determining the coordinates of edge points can be suitably changed similar to the above described first embodiment.

(4) Third Embodiment of Pattern Inspecting Method

Figure 6A:
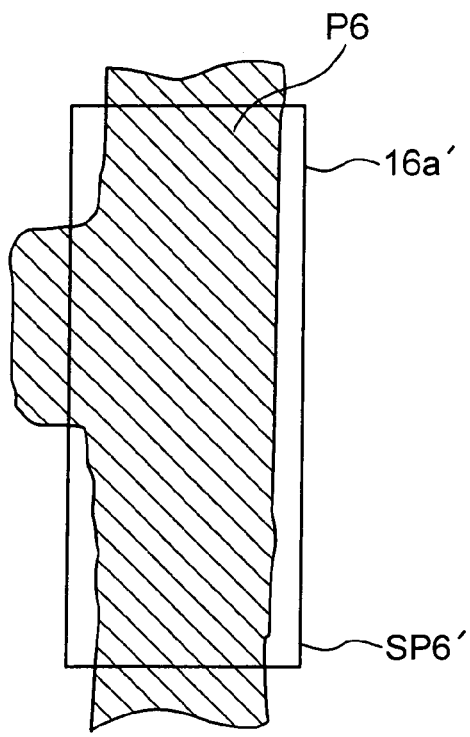
FIGS. 6A through 6C are schematic diagrams for explaining a third embodiment of a pattern inspecting method according to the present invention.
Figure 6B:
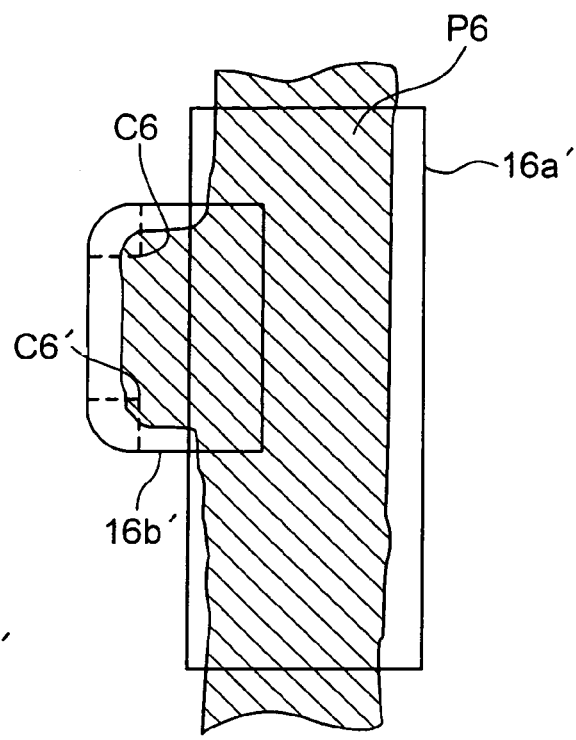

Referring to FIGS. 6A through 6B, the third embodiment of a pattern inspecting method according to the present invention will be described below. This embodiment is intended to eliminate the problems described with respect to the regions Ep12 and Ep14 in FIG. 31, and is characterized in that a plurality of ROI boundary shapes are combined to set an ROI boundary suitable for a complicated pattern.

First, image data of a pattern P6 to be inspected are incorporated into the image acquiring part 132 of the image processing unit 130 from the SEM unit 110 via the host computer 124 and the image is displayed on the display screen 210 (see FIG. 2) by the display part 126.

Then, with respect to the displayed image, a first ROI boundary 16a' is set as shown in FIG. 6A by dragging the mouse M and selecting the Rectangle button 220b in the pull-down menu.

Then, a second ROI boundary 16b' is set as shown in FIG. 6B by dragging the mouse M and selecting the Round 2 (see FIG. 3) in the pull-down menu.

Figure 6C:
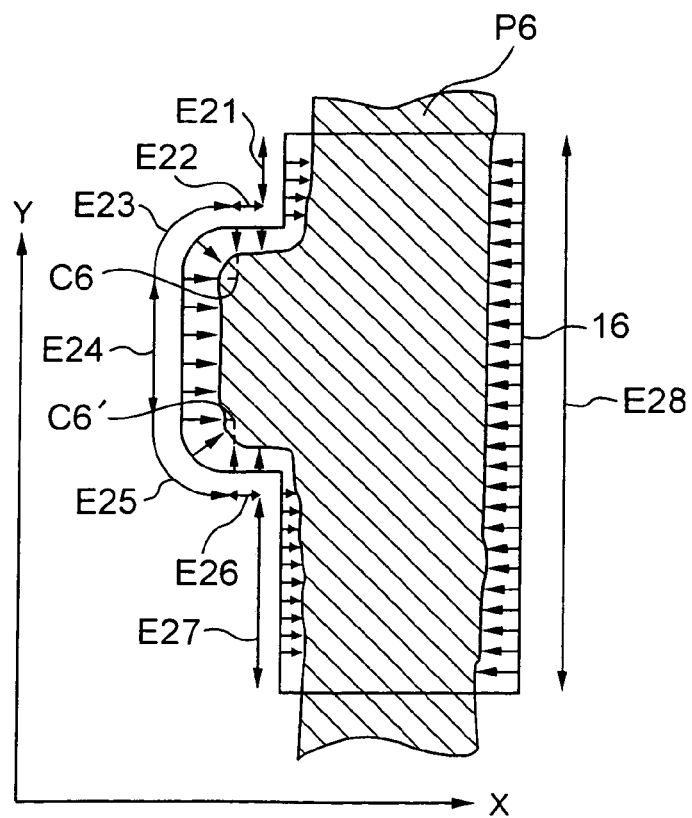

Then, a region surrounded by the first ROI boundary 16a' and a region surrounded by the second ROI boundary 16b' is synthesized to prepare a single ROI boundary 16 as shown in FIG. 6C and an edge searching direction corresponding to each region in the ROI boundary 16 to search an edge from a pixel on the ROI boundary 16 toward the interior of the ROI boundary 16 is determined as follows.

E21: direction from ROI boundary 16 and parallel to X-axis
E22: direction from ROI boundary 16 and parallel to Y-axis
E23: direction from ROI boundary 16 toward center C6 of ¼ circle
E24: direction from ROI boundary 16 and parallel to X-axis
E25: direction from ROI boundary 16 toward center C6'
E26: direction from ROI boundary 16 and parallel to Y-axis
E27: direction from ROI boundary 16 and parallel to X-axis
E28: direction from ROI boundary 16 and parallel to X-axis Similar to the second and third embodiments, in edge search, the coordinates of the outermost position of positions wherein the density was 50% of the maximum and minimum values were defined as coordinates of an edge point.

Figure 31:
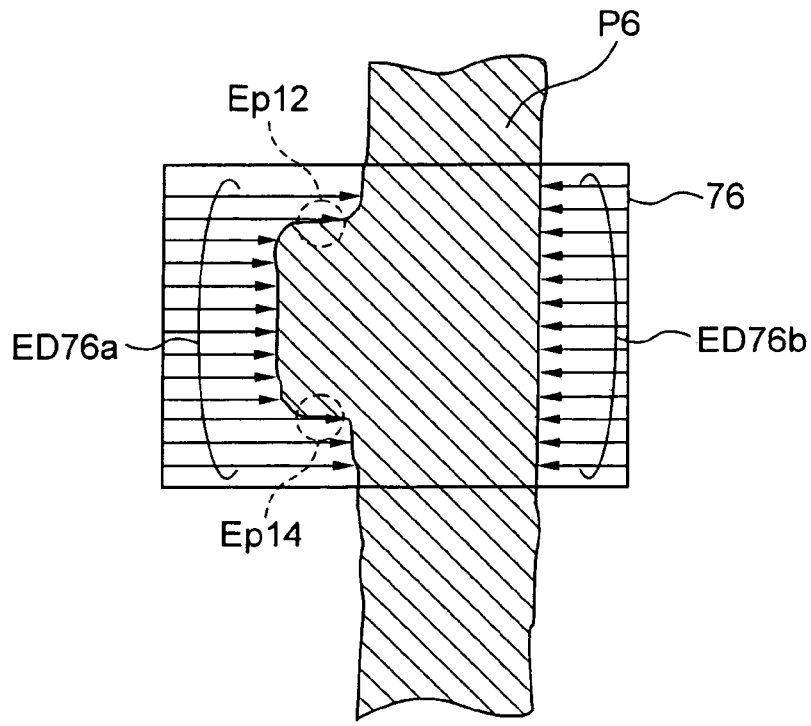

By means of the method in the above described embodiment, it is possible to prevent the failure in extraction of an edge in the regions Ep12 and Ep14 of FIG. 31.

Furthermore, also in this embodiment, the selection of the shape and size of the corner portion of the ROI boundary, the change of inside and outside of the boundary region in the edge search and the method for determining the coordinates of edge points can be suitably changed similar to the above described pattern inspecting methods in the first and second embodiments.

(5) Fourth Embodiment of Pattern Inspecting Method

Figure 7A:
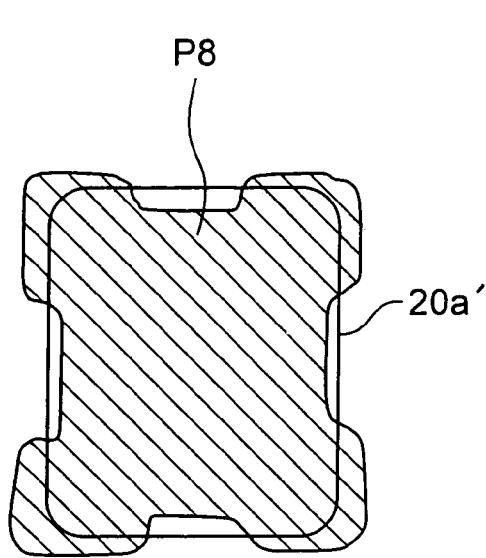
FIGS. 7A through 7C are schematic diagrams for explaining a fourth embodiment of a pattern inspecting method according to the present invention.
Figure 7B:
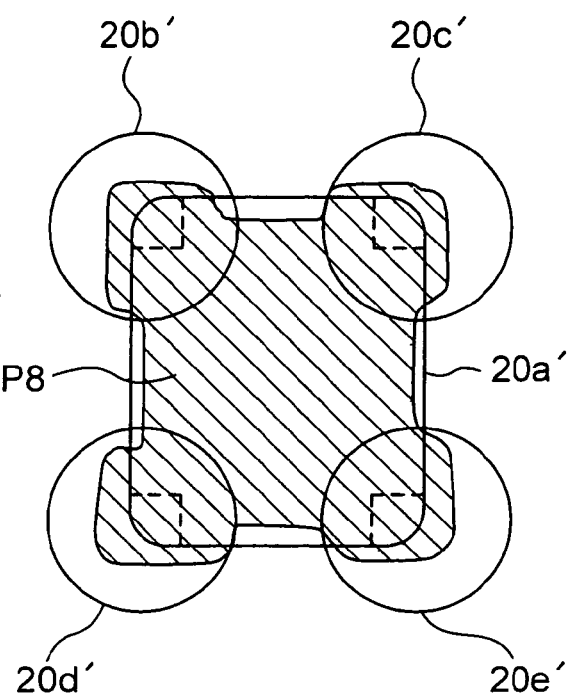
Figure 7C:
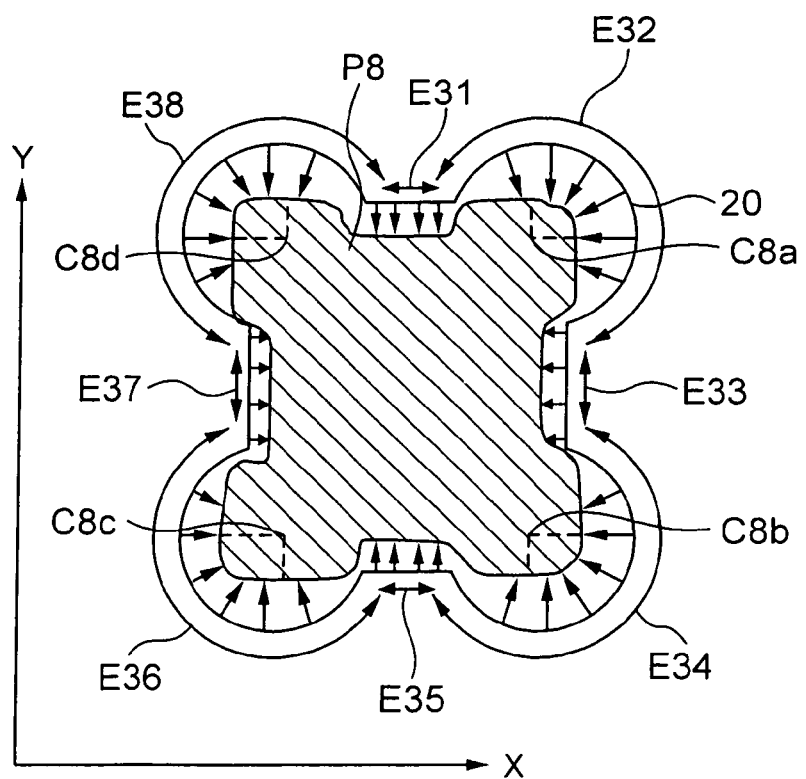

Referring to FIGS. 7 through 7C, the fourth embodiment of a pattern inspecting method according to the present invention will be described below. This embodiment is characterized by combining a plurality of ROI boundary shapes similar to the above described third embodiment to eliminate the problems described with respect to the regions Ep16 through Ep30 in FIG. 32.

First, image data of the pattern P8 to be inspected are incorporated into the image acquiring part 132 of the image processing unit 130 from the SEM unit 110 via the host computer 124 and the image is displayed on the display screen 210 (see FIG. 2) by the display part 126.

Then, with respect to the displayed image, a first ROI boundary 20a' is set as shown in FIG. 7A by dragging the mouse M and selecting the Round 4 button 220e4 in the pull-down menu.

Then, second ROI boundaries 20b' through 20e' for the four corners of the pattern P8 are set as shown in FIG. 7B by dragging the mouse M and selecting the Ellipse button 220c (see FIG. 3) in the pull-down menu.

Then, a region surrounded by the first ROI boundary 20a' and regions surrounded by the second ROI boundaries 20b' through 20e' are synthesized to prepare a single ROI boundary 20 as shown in FIG. 7C and an edge searching direction corresponding to each region in the ROI boundary 20 is determined as follows to search an edge toward the interior of the ROI boundary 20 from a pixel on the ROI boundary 20.

E31: direction from ROI boundary 20 and parallel to Y-axis
E32: direction from ROI boundary 20 toward center C8a of circle
E33: direction from ROI boundary 20 and parallel to X-axis
E34: direction from ROI boundary 20 toward center C8b
E35: direction from ROI boundary 20 and parallel to Y-axis
E36: direction from ROI boundary 20 toward center C8c
E37: direction from ROI boundary 20 and parallel to X-axis
E36: direction from ROI boundary 20 toward center C8d In this embodiment, similar to the above described first through fourth embodiments, the coordinates of the outermost position of positions wherein the density was 50% of the maximum and minimum values were defined as coordinates of an edge point in the edge search.

Figure 32:
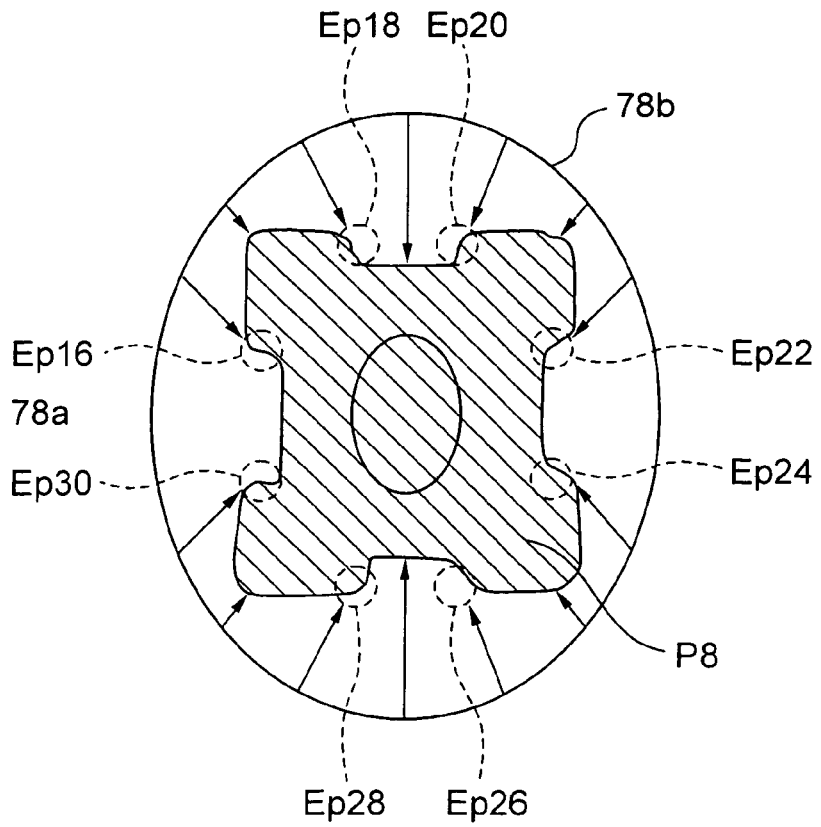

By using the pattern inspecting method in this embodiment, it is possible to prevent failure in extraction of an edge in the regions Ep16 through and Ep30 of FIG. 32.

Furthermore, similar to the above described embodiment, also in this embodiment the selection of the shape and size of the corner portion of the ROI boundary, the change of inside and outside of the boundary region in the edge search and the method for determining the coordinates of edge points can be suitably changed.

(6) Fifth Embodiment of Pattern Inspecting Method

Figure 8A:
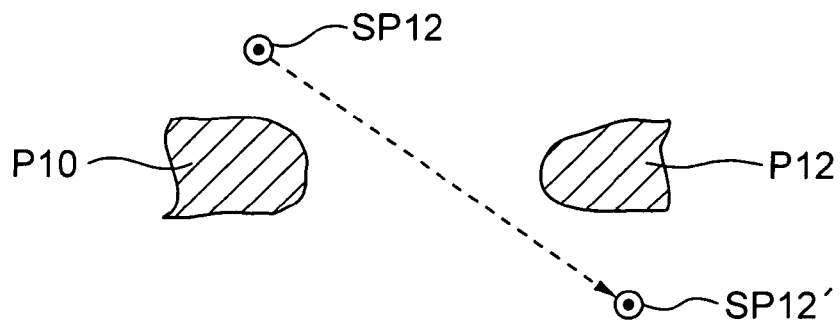
FIGS. 8A through 8C are schematic diagrams for explaining a fifth embodiment of a pattern inspecting method according to the present invention.
Figure 8B:
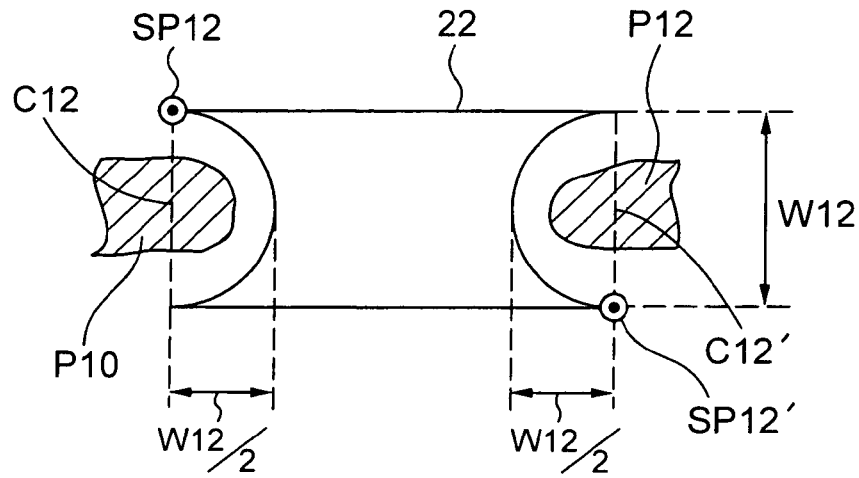
Figure 8C:
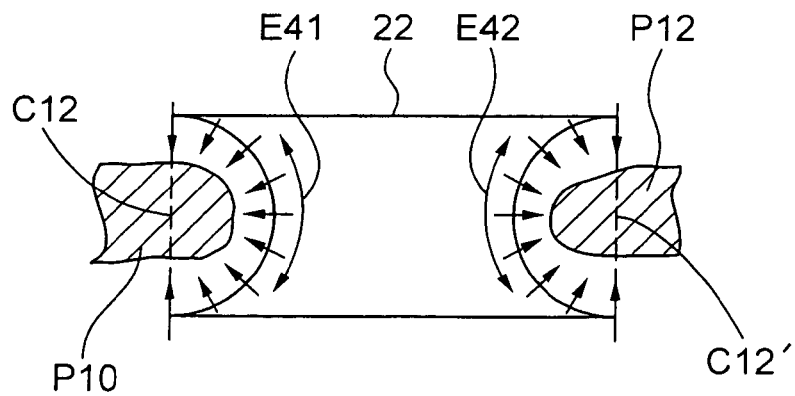
Figure 33:
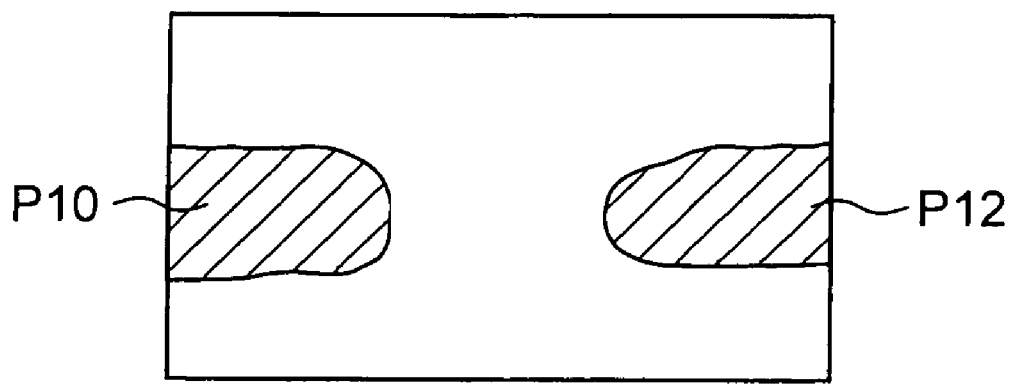

Referring to FIGS. 8A through 8C, the fifth embodiment of a pattern inspecting method according to the present invention will be described below. This embodiment is intended to eliminate the problems shown in FIG. 33, and is characterized in that an ROI boundary is set by using a rectangle wherein semi-circles, semi-ellipses or parabolas are arranged so as to extend inwardly from both ends of the rectangle as if parts of each end of the rectangle is cut out.

First, image data of the patterns P10 and P12 to be inspected are incorporated into the image acquiring part 132 of the image processing unit 130 from the SEM unit 110 via the host computer 124 and the image is displayed on the display screen 210 (see FIG. 2) by the display part 126.

Then, as shown in FIG. 8A, the mouse cursor CS is moved to a position at which one end of facing corners of the ROI boundary would be arranged on the displayed image and the mouse M is clicked to assign a reference point SP12 on the left side above the tip of the pattern P10. Then, the mouse cursor CS is dragged to a position at which the other end of the facing corners of the ROI boundary would be arranged and a reference point SP12' is assign.

Then, right and left both ends of the rectangular boundary determined on the basis of the reference points SP12 and 12' are replaced with semi-circles so as to extend toward the interior of the boundary and an ROI boundary 22 is set as shown in FIG. 8B. Herein, similar to the above described first embodiment, the radius of the semi-circle is set to be w12/2 with respect to a rectangular boundary width w12 determined with the reference points SP12 and 12' so that both ends of the semi-circle contact the sides of the original rectangular boundary. This can be easily set by selecting the Capsule 4 button 220d4 from the pull-down menu in the display screen 210.

Thus, also in this embodiment, the ROI boundary 22 can be set only by assigning the reference points SP12 and 12' with the mouse M.

Then, an edge searching direction is assigned by selecting, e.g., the button 222b, from the two buttons of the edge search direction assigning part 222 (see FIG. 2). Thus, as shown in FIG. 8C, the contour extracting part 138 of the image processing unit 130 searches an edge from pixels on the ROI boundary 22 toward each region in the ROI boundary 22 by, e.g., the following procedures.

E41: direction from ROI boundary 22 toward center C12 of circle

E42: direction from ROI boundary 22 toward center C12' of circle

Moreover, coordinates of edge points were determined by the above described threshold method.

While the edge search has not been carried out with respect to upper and lower both sides of the rectangular boundary in this embodiment, the edge search in the searching direction shown by the Capsule 4 in FIG. 3 may be added if necessary.

Furthermore, similar to the above described embodiment, also in this embodiment the selection of the shape and size of both end portions of the ROI boundary, the change of inside and outside of the boundary region in the edge search and the method for determining the coordinates of edge points can be suitably changed.

(7) Sixth Embodiment of Pattern Inspecting Method

Figure 34:
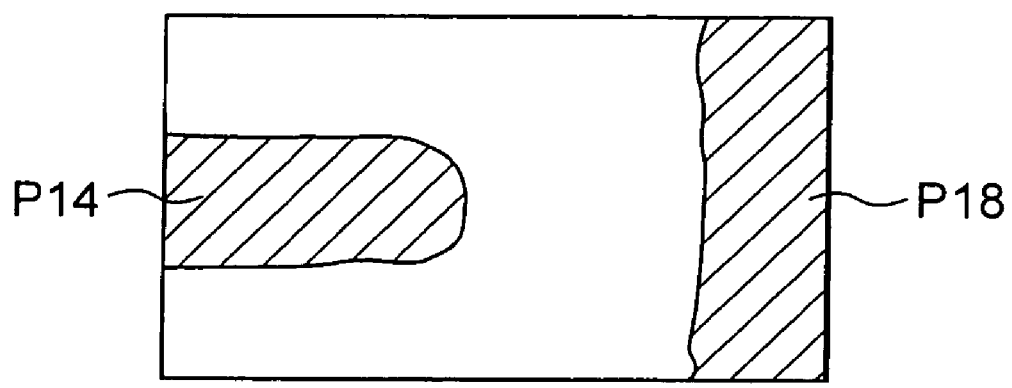
Figure 35:
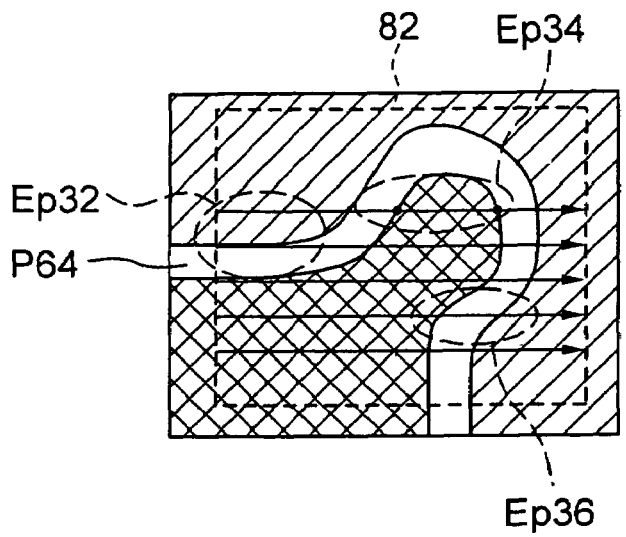
Figures 36A, 36B:
FIG. 36A is a diagram showing an example of a density profile of a SEM image when an edge searching direction is not perpendicular to an edge.
FIG. 36B is a diagram showing an example of a density profile of an image when an edge searching direction is perpendicular to an edge.
Figures 37A, 37B:
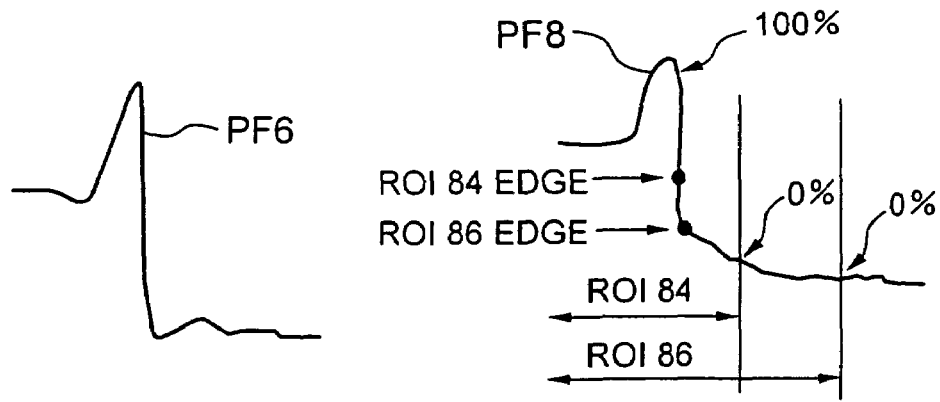
FIG. 37A is a diagram showing an example of a density profile of a pattern having a perpendicular cross-sectional shape.
FIG. 37B is a diagram showing an example of a density profile of a pattern wherein a cross-sectional shape has a taper.

Referring to FIG. 9, the sixth embodiment of a pattern inspecting method according to the present invention will be described below. This embodiment is intended to eliminate the problems shown in FIG. 34, and is characterized in that an ROI boundary is set by using a rectangle wherein a semi-circle, a semi-ellipse or a parabola is arranged in replace of one end of the rectangle so as to extend inwardly from the contour of the rectangle.

First, image data of patterns P14 and P18 to be inspected are incorporated into the image acquiring part 132 of the image processing unit 130 from the SEM unit 110 via the host computer 124 and the image is displayed on the display screen 210 (see FIG. 2) by the display part 126.

Figure 9A:
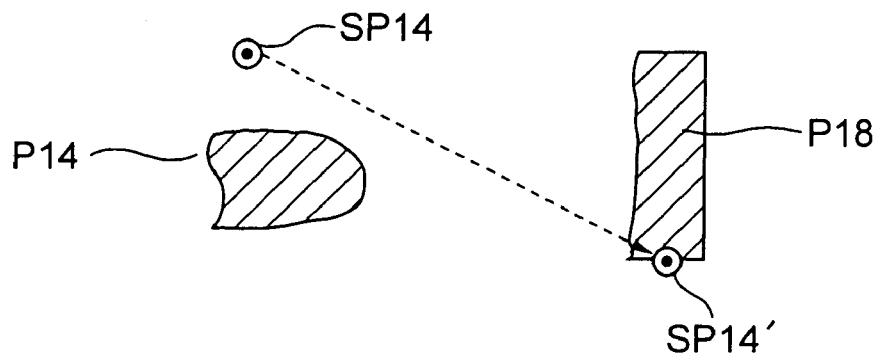
FIGS. 9A through 9C are schematic diagrams for explaining a sixth embodiment of a pattern inspecting method according to the present invention.

Then, as shown in FIG. 9A, the mouse cursor CS is moved to a position, at which one end of facing corners of the ROI boundary would be arranged, near the tip portion of the pattern P14 in the displayed image, and the mouse M is clicked to assign a reference point SP14 on the left side above the tip of the pattern P14. Then, the mouse cursor CS is dragged to a position, at which the other end of the facing corners of the ROI boundary would be arranged, in the lower region of the pattern P18 to assign a reference point SP14'.

Figure 9B:
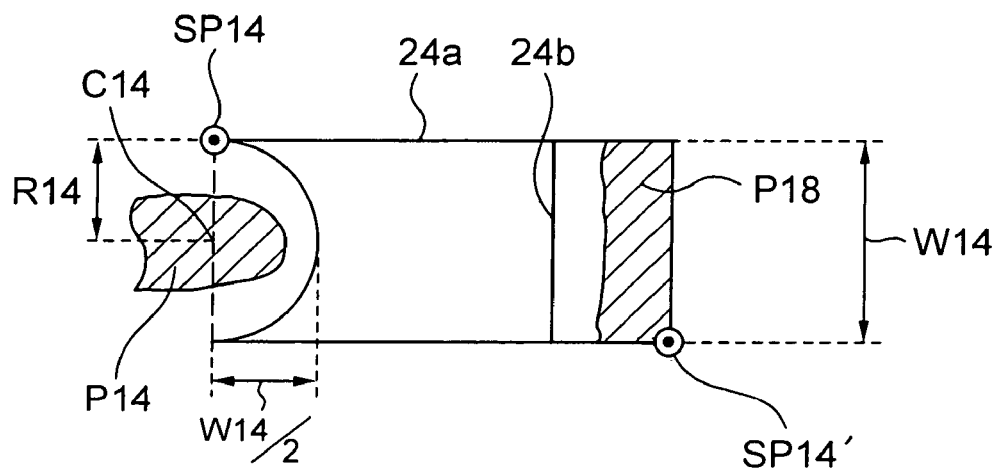

Then, one end covering the tip portion of the pattern P14 of right and left both ends of the rectangular boundary determined by the reference points SP14 and 14' is replaced with a semi-circle to set an ROI boundary 24a as shown in FIG. 9B. Herein, similar to the above described first embodiment, the radius R14 of the semi-circle is set to be w14/2 with respect to the width w14 of the rectangular boundary determined by the reference points SP14 and 14' so that both ends of the semi-circle contact the sides of the original rectangular boundary. This can be easily set by selecting the Capsule 4 button 220d2 from the pull-down menu in the display screen 210.

Thus, also in this embodiment, the ROI boundary 24a can be set only by assigning the reference points SP14 and 14' with the mouse M.

Then, a line parallel to the right side of the ROI boundary 24a is set outside of the pattern P18 within the ROI boundary 24a, thereby setting an auxiliary line 24b for searching an edge of the pattern P18.

Figure 9C:
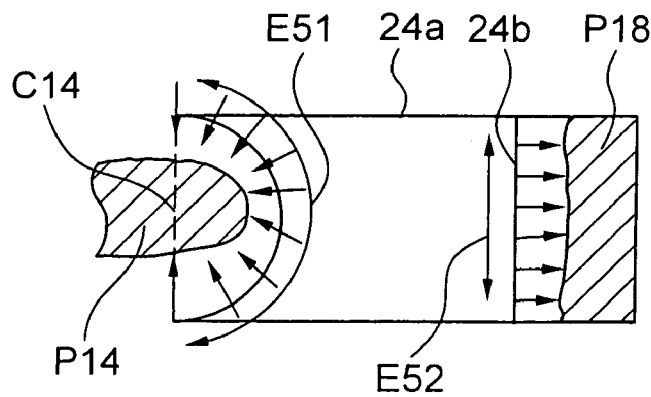

Then, an edge searching direction is assigned by selecting, e.g., the button 222b, from the two buttons of the edge search direction assigning part 222 (see FIG. 2). Thus, as shown in FIG. 9C, the contour extracting part 138 of the image processing unit 130 searches edges from pixels on the semi-circle of the ROI boundary 24a toward the center C14 of the semi-circle and from the auxiliary line 24b toward the outside of the ROI boundary 24a by, e.g., the following procedures.

E51: direction from ROI boundary 24a toward center C14 of circle

E52: direction from auxiliary line 24b to the right

Moreover, coordinates of edge points were determined by the above described threshold method.

While the edge search has not been carried out with respect to upper and lower both sides of the rectangular boundary in this embodiment, the edge search in the searching direction shown by the Capsule 2 in FIG. 3 may be added if necessary.

Furthermore, similar to the above described embodiment, also in this embodiment the selection of the shape and size of end portions of the ROI boundary, the change of inside and outside of the boundary region in the edge search and the method for determining the coordinates of edge points can be suitably changed.

(8) Seventh Embodiment of Pattern Inspecting Method

Figure 10A:
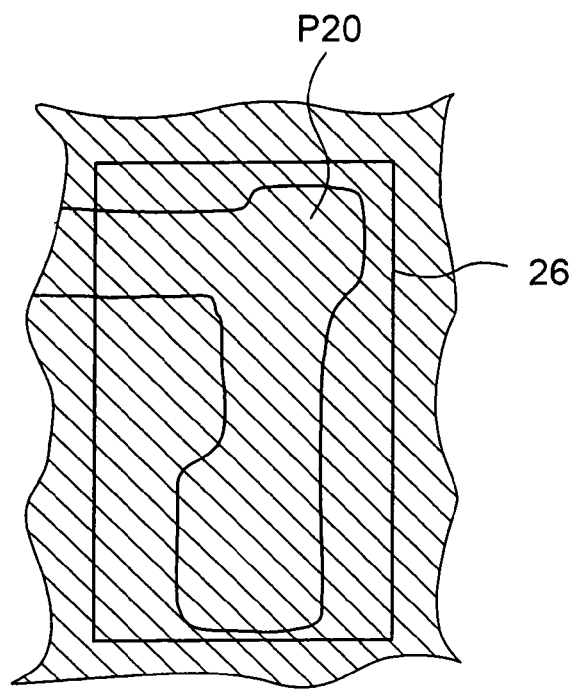
FIGS. 10A through 10C are schematic diagrams for explaining a seventh embodiment of a pattern inspecting method according to the present invention.
Figure 10B:
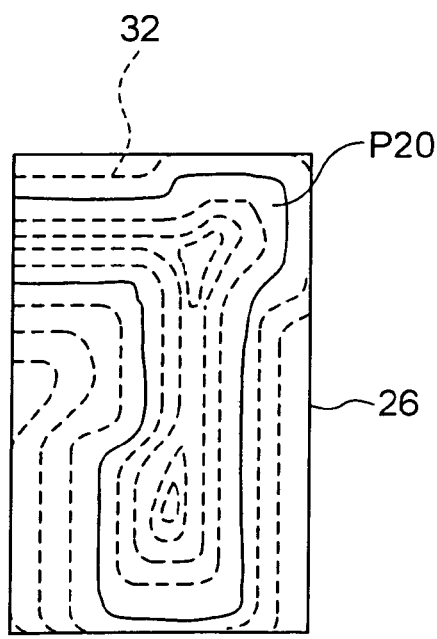
Figure 10C:
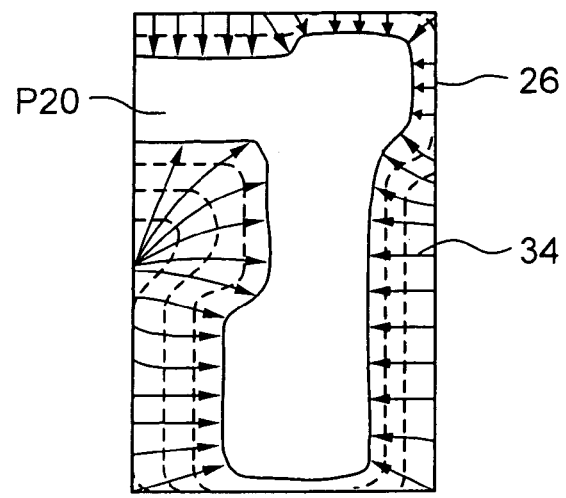

Referring to FIG. 10, the seventh embodiment of a pattern inspecting method according to the present invention will be described below. This embodiment is characterized in that an equi-potential curve is led on the basis of gray levels of pixels of the SEM image to prepare a group of curves perpendicular to the equi-potential curve and an edge search is carry out along the group of curves which are thus obtained.

First, similar to the above described embodiments, image data of the pattern P20 to be inspected are incorporated into the image acquiring part 132 of the image processing unit 130 from the SEM unit 110 via the host computer 124 and the image is displayed on the display screen 210 (see FIG. 2) by the display part 126.

Then, with respect to the displayed image, as shown in FIG. 10A, a region of interest 26 serving as an object to be inspected is set by the above described mouse drag and selection of the Rectangle button 220b in the pull-down menu.

Then, the Potential button 220f in the pull-down menu 220 is select by moving the cursor CS and clicking the mouse M. Thus, the edge searching curve calculating part-136 (see FIG. 1) of the image processing unit 130 carries out the following operation.

That is, a plane to which an image belongs in the region of interest 26 is assumed as a complex plane z=x+iy, and a function of the image at position z on the image is defined by the following expression on the basis of a gray level $g_i$ of a pixel at position $z_i = x_i + iy_i$:

$$V(z) = \sum_{i=1}^{N} \frac{f(g_i)}{h(|z - z_i|)} \quad (3)$$

wherein $f(g_i)$ is a function which is monotone with respect to $g_i$, and $h(|z-z_i|)$ is a function smoothly decreasing with $|z-z_i|$, which can be changed to, e.g., the following form, to be a function capable of being differentiated on z plane.

$$V(z) = \sum_{i=1}^{N} g_i \frac{1 - \exp(-|z - z_i|)}{|z - z_i|} \quad (4)$$

The equi-potential curves of this function are shown in FIG. 10B. Broken lines 32 similar to contour lines in the figure are equi-potential curves. However, since it takes a lot of times to calculate such contour lines, it is not always required to display the broken lines 32 on the screen.

Then, a function W(z) calculated from the function in expression (3) and Cauchy-Riemann's relation.

$$\frac{\partial V}{\partial x} = \frac{\partial W}{\partial y}, \quad \frac{\partial V}{\partial y} = -\frac{\partial W}{\partial x} \quad (5)$$

Then, W is calculated by a numerical calculation, and a group 34 of curves on z plane wherein W=Constant is plotted by sequentially giving Constants at appropriate intervals. This group 34 of curves is always perpendicular to the equi-potential curves 32 by the principle of complex analysis since function V+iW is a regular function.

Finally, similar to conventional methods, edges are searched along the group 34 of curves thus obtained. As a result, it is possible to search edges with respect to a complicated pattern, such as a pattern P20, for which the edge search were incapable of being carried out in the prior art.

(9) Second Embodiment of Pattern Inspecting System

Figure 11:
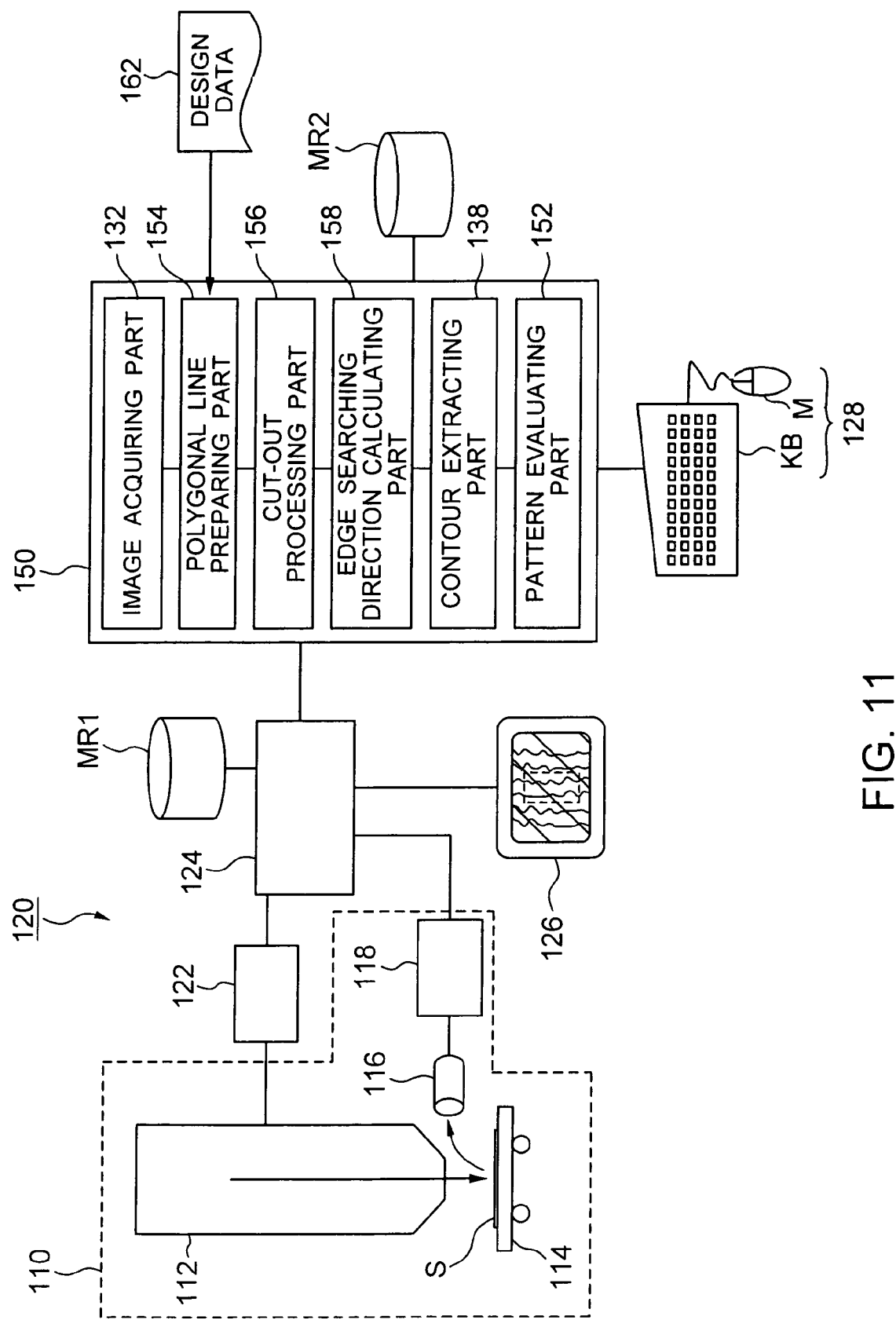
FIG. 11 is a block diagram showing a second embodiment of a pattern inspecting system according to the present invention.

The second embodiment of a pattern inspecting system according to the present invention will be described below. FIG. 11 is a block diagram showing a schematic construction of a pattern inspecting system in this embodiment. As can be clearly seen from the comparison with FIG. 1, the pattern inspecting system 120 shown in FIG. 11 is characterized in that an image processing unit 150 is substituted for the image processing unit 130 and in that design data 162 are incorporated into the image processing unit 150 if required. Other constructions of the pattern inspecting system 120 are substantially the same as those of the pattern inspecting system 100 shown in FIG. 1.

The image processing unit 150 includes a polygonal line preparing part 154, a cut-out processing part 156 and an edge searching direction calculating part 158, which are characteristic in this embodiment, in addition to an image acquiring part 132, a contour extracting part 138 and a pattern evaluating part 152.

The image acquiring part 132 is designed to acquire the SEM image of a pattern to be inspected from the. SEM unit 110 to remove noises and carry out a binary coding to extract a schematic contour of the pattern. The polygonal line preparing part 154 is designed to prepare a polygonal line having a shape approximating the shape of the pattern by a method which will be described later. The cut-out processing part 156 is designed to extract vertices of the polygonal line prepared by the polygonal line preparing part 154 and to carry out a cut-out processing with respect to each of the vertices. The edge searching direction calculating part 158 is designed to calculate an edge searching direction on the basis of the shape of the polygonal line prepared by the polygonal line preparing part 154. The contour extracting part 138 is designed to extract contour information, such as coordinates of edge points of the pattern, in the calculated edge searching direction.

As the eighth through tenth embodiments of a pattern inspecting method according to the present invention, the specific operation of the pattern inspecting system shown in FIG. 11 will be described below. In the following descriptions, a pattern formed of a Cr film on quartz will be inspected as a sample.

(10) Eighth Embodiment of Pattern Inspecting Method

Figure 12:
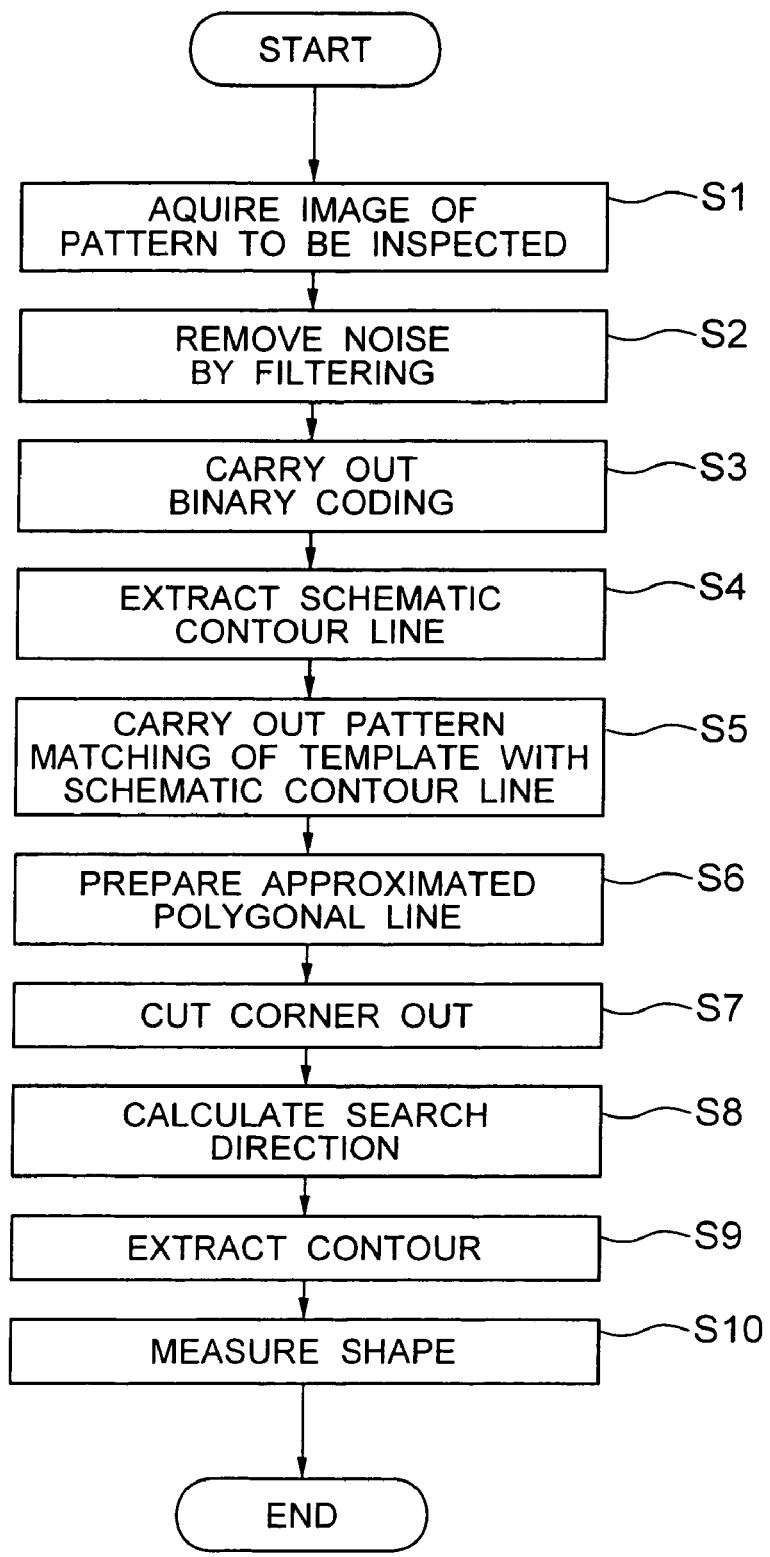
FIG. 12 is a flow chart for explaining an eighth embodiment of a pattern inspecting method according to the present invention.

FIG. 12 is a flow chart for explaining a pattern inspecting method in this embodiment, and FIGS. 13 through 20 are illustrations for explaining the pattern inspecting method in this embodiment.

Figure 13:
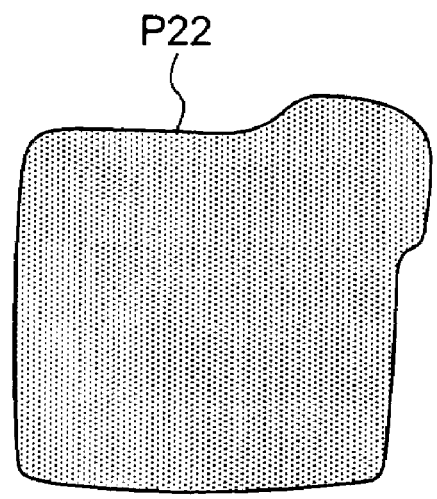
FIG. 13 is a diagram showing a SEM image of a pattern which is an object to be inspected by the pattern inspecting method shown in FIG. 12.
Figure 14:
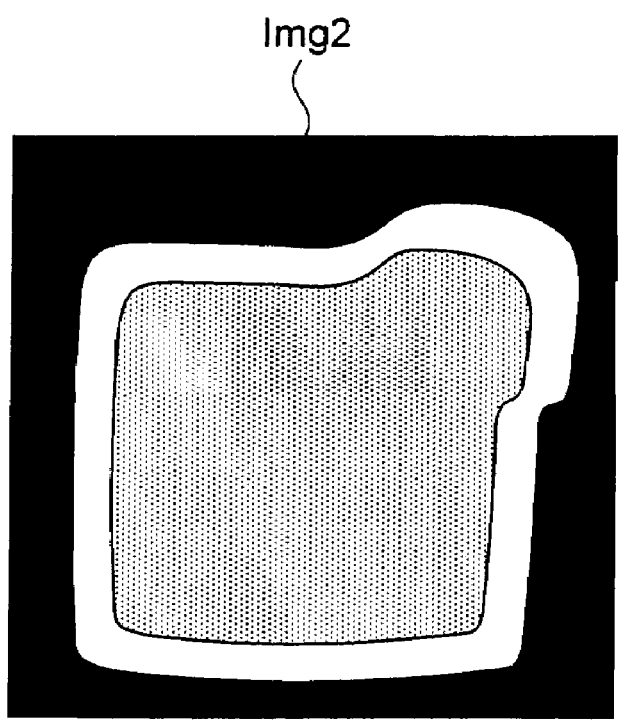

First, a sample (reticle) wherein a pattern to be inspected is formed is carried in a sample chamber of the SEM unit 110, and the stage 114 is operated to acquire a SEM image of the pattern to be inspected (step S1). A pattern P22 shown in FIG. 13 is an example of a pattern to be inspected in this embodiment. The pattern P22 shown in this figure has a rectangular shape wherein one of four corners expands toward the outside region. FIG. 14 shows an example of a SEM image of the pattern 22 to be inspected.

Then, pepper and salt noises are removed from the image data of the obtained SEM image by a median filter (step S2), and then, a binary coding is carried out (step S3). A SEM image of the pattern P22 after the binary coding is shown in FIG. 15. In this figure, a portion based on CR and a pattern edge portion are brighter to be displayed as white, and a quartz portion other than the above portions is darker to be displayed as black. A schematic contour line in the while portion is extracted from this binary coded image by the contour tracking method or the like (step S4).

Then, this schematic contour line is approximated to a polygonal line formed by horizontal and vertical lines. In this embodiment, a method for preparing a polygonal line shape is as follows.

First, various templates. TP2, TP4 and TP6 shown in FIGS. 16A through 16C, respectively, are previously prepared, and a pattern matching of each of these templates with the schematic contour line is carried out (step S5). The matching is carried out while carrying out transformations of coordinate system, such as rotation, expansion/reduction, and parallel translation, with respect to each of the templates. Thus, it is possible to carry out the matching even if the size of the templates is different from the size of the actual image.

Figure 17:
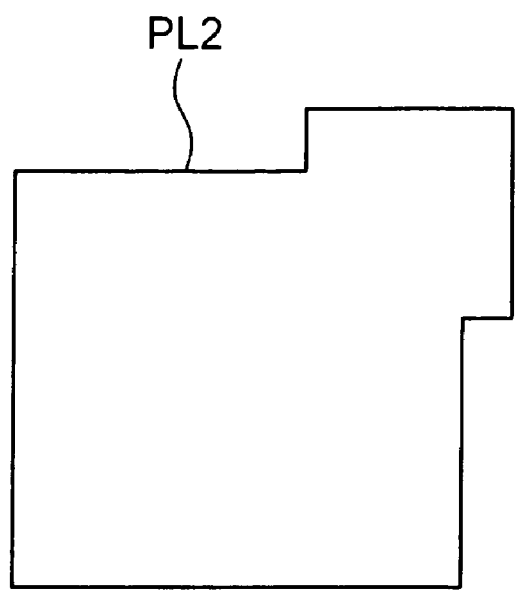
FIG. 17 is a diagram showing an example of a provisional polygonal line shape obtained by the pattern inspecting method shown in FIG. 12.

Then, the matched portions of the respective templates are extended to be connected to each other to prepare a polygonal line which approximates the schematic contour of the pattern (step S6). An example of a polygonal line thus prepared is shown in FIG. 17. A polygonal line PL2 shown in this figure is prepared with respect to the pattern P22 shown in FIG. 13. Furthermore, information whether the pattern is a closed curve or information about the number of vertices may be acquired from the design data 162 (see FIG. 11) to restrict the matching.

Figure 18:
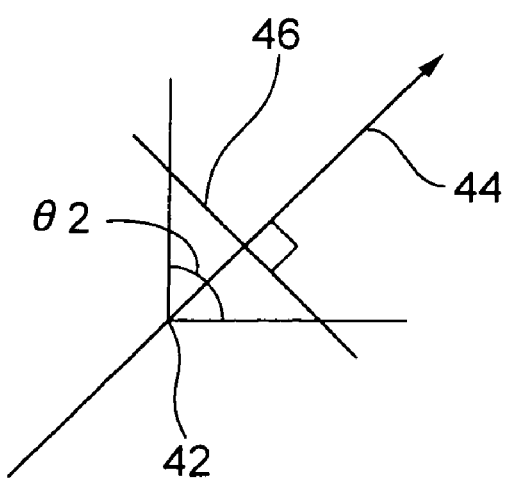
FIG. 18 is a diagram for explaining a method for cutting the respective corner portions of the polygonal line shape shown in FIG. 17.
Figure 19:
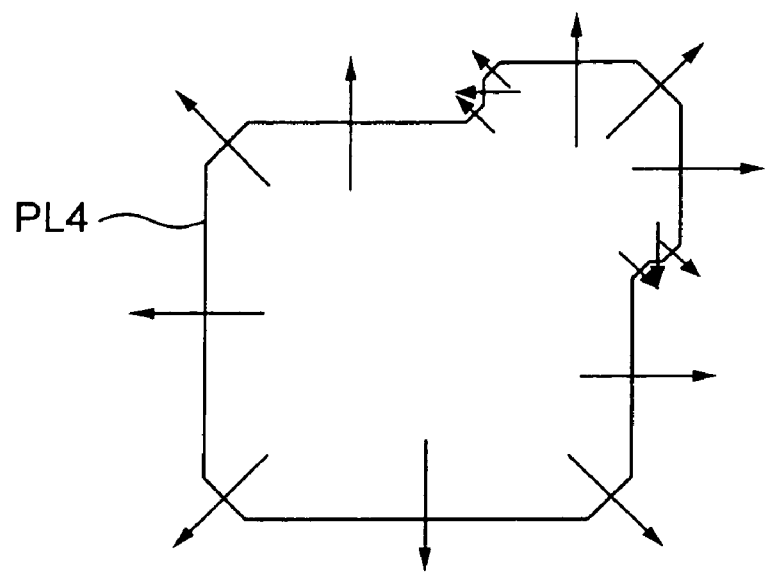
FIG. 19 is an illustration for explaining a method for searching edges on the basis of a final polygonal line shape.

Then, the vertices of the polygonal line are extracted, and the cut-out processing is carried out with respect to each of the corner portions including the vertices (step S7). FIG. 18 is an illustration for explaining a cut-out processing method in detail. First, a straight line 44 is drawn in a direction so that a smaller angle θ2 of angles formed by two lines intersecting a vertex 42 is divided into two equal parts, and then, a normal line 46 perpendicular to the straight line 44 is drawn. Finally, the polygonal line is cut out about the vertex in a direction parallel to the normal line 46. The size of the cut-out can be arbitrarily determined by the operator. A polygonal line PL4 after carrying out such a cut-out processing is shown in FIG. 19.

Next, a searching direction is calculated at regular intervals in a direction perpendicular to the prepared polygonal line PL4 (step S8). That is, as shown by arrows in FIG. 19, the search is carried out in a vertical direction in the horizontal portions of the polygonal line PL4, in a horizontal direction in the vertical portions thereof and in a direction perpendicular to each line of the cut-out in the cut-out portions.

According to this embodiment, the above described polygonal line can be prepared directly from the above described image data or processed image data by carrying out the above described pattern matching. In addition, even if a graphic form or pattern to be inspected has a complicated shape having a round, the coordinates of edge points can be precisely and simply detected by the above described cut-out processing.

In this embodiment, the edge search was carried out inwardly from the outside of the pattern since the island-like pattern of Cr film is measured as shown in FIG. 14. That is, the edge searching direction is a direction inwardly from the outside of the polygonal line PL4. With respect to the binary coded image of FIG. 15, the edge searching direction is a direction toward the while portion from the black portion.

Contrary to this embodiment, if a hole-line pattern is formed in a Cr film, the edge search is carried out outwardly from the interior of the pattern. That is, the edge searching direction is a direction outwardly from the interior of the polygonal line. With respect to the binary coded image, the edge searching direction is a direction from the black portion toward the white portion.

In this embodiment, the sample having the pattern formed of the Cr film is used, so that the edge searching direction is always a direction from black portion (quartz) toward the white portion (Cr film) of the binary coded image. If a sample having a different film construction is measured, the edge search may be carried out from the white portion toward the black portion.

Figure 20:
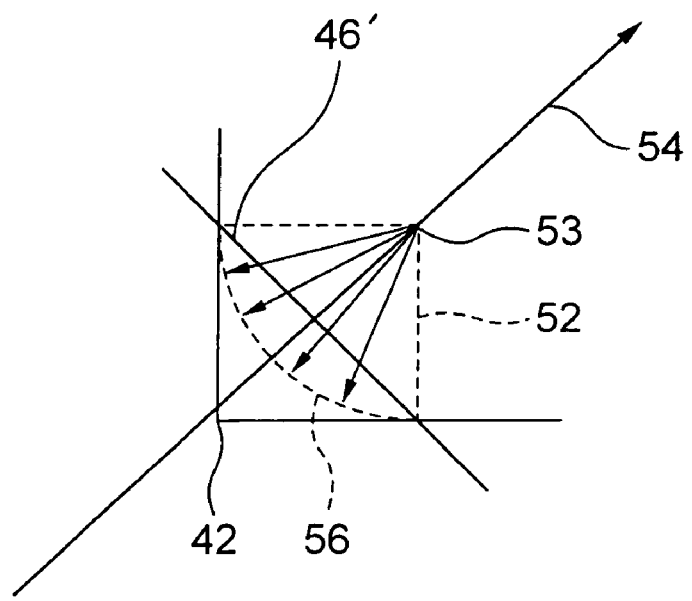
FIG. 20 is an illustration for explaining another method for cutting the respective corner portions of a polygonal line shape.

The edge searching direction in the cut-out portion may be calculated as follows. That is, as shown in FIG. 20, a right-angled isosceles triangle 52 having a segment 46' of a cut-out portion 56 as a base is prepared so that the vertex 53 of the right-angled portion becomes inside of a polygonal line PL2. Next, a ¼ circle having a radius which corresponds to the length of an isosceles portion of the triangle 52 is drawn about the vertex 53. That is, both end points of the ¼ circle are coincident with the starting and end points of the segment 46' of the cut-out. Then, the edge search is carried out from the vertex 53 toward the ¼ circle with a regular degrees of intervals at angles. In addition, the center of the ¼ circle should not be limited to the vertex 53 of the isosceles triangle 52, but it may be an arbitrary point on a straight line 54 which is perpendicular to the segment 46' of the cut-out portion and which divides the segment 46' into two equal parts.

The length (width) of the search is previously set so that the outside and inside are equal to each other viewed from the polygonal line PL4. Thus, it is always possible to extract edges at the same ROI width.

The edge search is carried out in accordance with a predetermined algorithm in the searching direction thus calculated to extract the contour of the edge of the pattern P22 (step S9).

Finally, the dimension, area, edge roughness, perimeter, round extent and so fourth of the pattern to be inspected a recalculated on the basis of the obtained contour information (step S10) to output the results of inspection.

Thus, according to this embodiment, even in the case that an graphic form to be inspected has a complicated contour shape, it is possible to easily and stably acquire its contour information since the edge searching direction is determined on the basis of the polygonal line having a shape approximating the shape of the graphic form to be inspected.

While the binary coding has been used for preparing the schematic contour of the pattern in this embodiment, the present invention should not be limited thereto, but another method, such as a differential filter, may be used. While the acquired image has been pre-processed by the median filter processing in this embodiment, a moving average or a weighting moving average may be used in place of this. The pattern inspecting method in this embodiment may be simultaneously operated on line on the image processing unit 150 while the SEM image is being observed on the display screen 210 of the display part 126, or may be operated off line after acquiring the SEM image. Moreover, while the templates TP4, TP6 and TP8 including the straight or hook-shaped polygonal lines have been utilized for preparing the polygonal line PL2 in this embodiment, a method for preparing a circumscribing or inscribing rectangle from a schematic contour line may be used if a pattern to be inspected is a simple island-like pattern. The above described points are the same with respect to the ninth and tenth embodiments which will be described below.

(11) Ninth Embodiment of Pattern Inspecting Method

Figure 21:
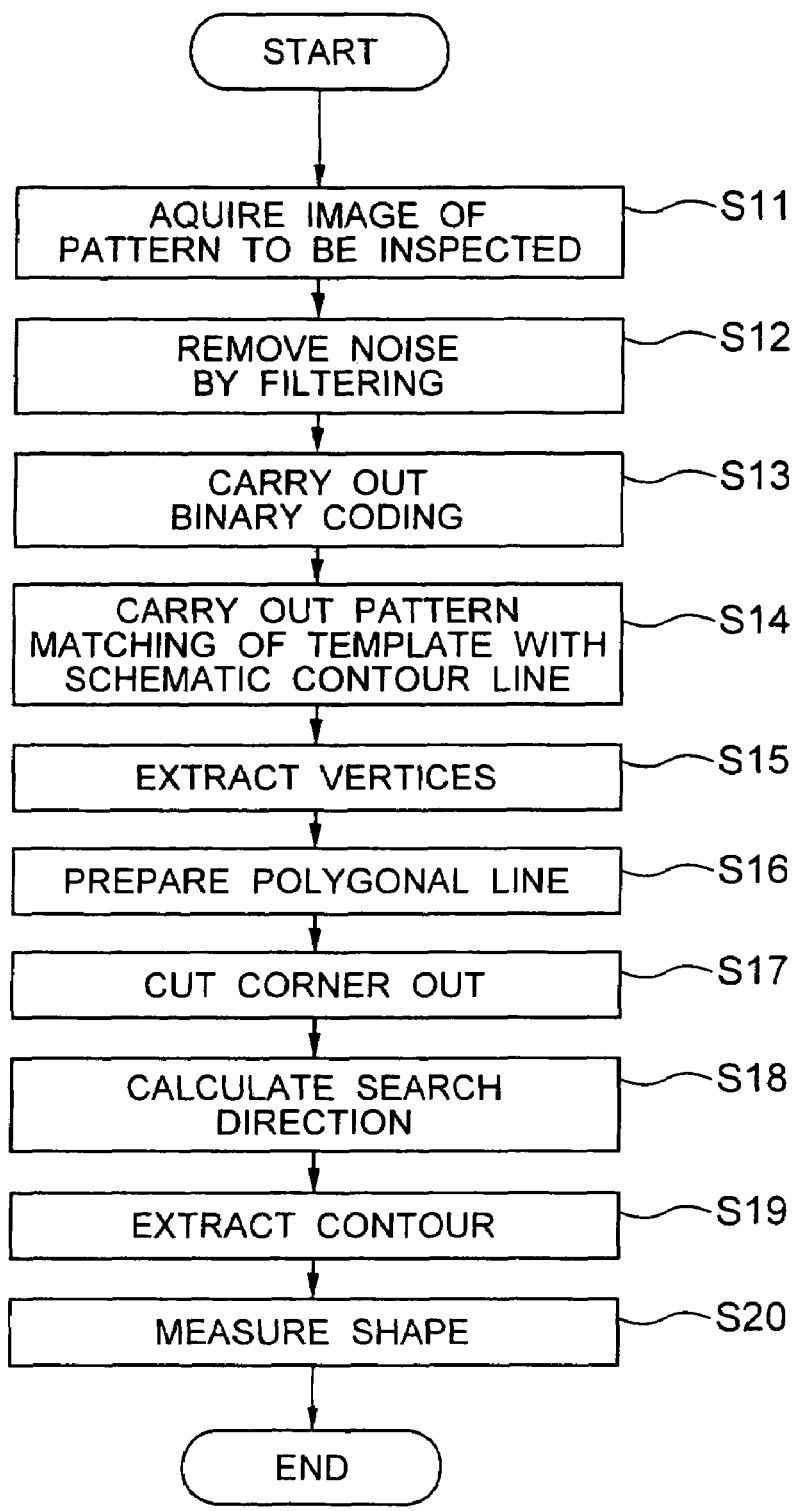
FIG. 21 is a flow chart for explaining a ninth embodiment of a pattern inspecting method according to the present invention.

Referring to the accompanying drawings, the ninth embodiment of a pattern inspecting method according to the present invention will be described below. FIG. 21 is a flow chart showing the schematic procedure for carrying out a pattern inspecting method in this embodiment, and FIGS. 21 through 25 are illustrations for explaining the pattern inspecting method in this embodiment. Also in this embodiment, the pattern P22 shown in FIG. 13 is used as a pattern to be inspected.

First, as shown in FIG. 21, similar to the above described eighth embodiment, a sample wherein a fine pattern is formed is carried in a sample chamber of the SEM unit 110, the stage 114 is operated to acquire a SEM image of the pattern P22 to be inspected, noises are removed and a binary coding is carried out (steps S11 through S13).

Figure 22:
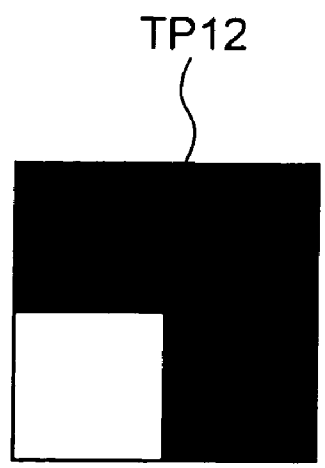
FIG. 22 is a diagram showing an example of a template for use in the pattern inspecting method shown in FIG. 21.
Figure 23:
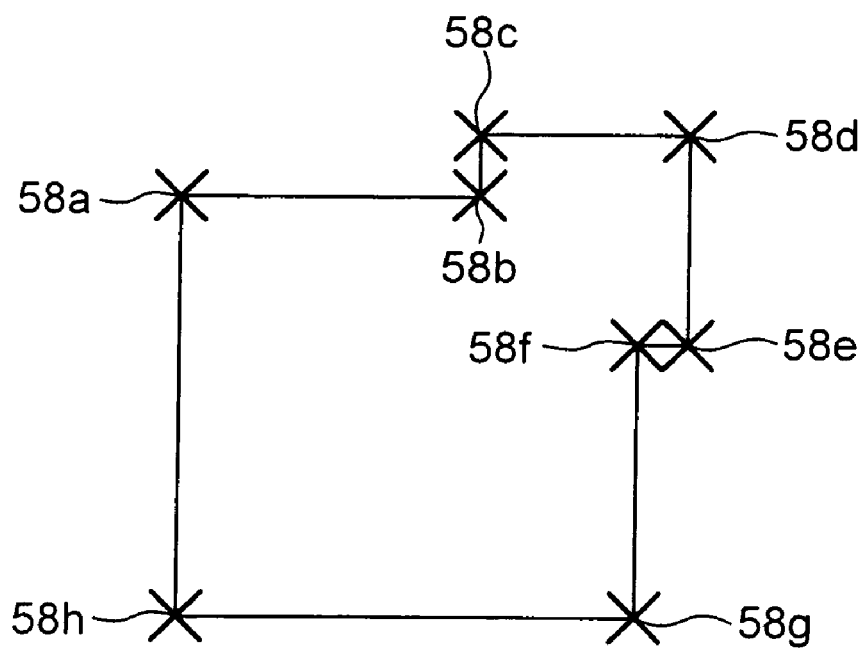
FIG. 23 is a schematic diagram for explaining the pattern inspecting method shown in FIG. 21.
Figure 24:
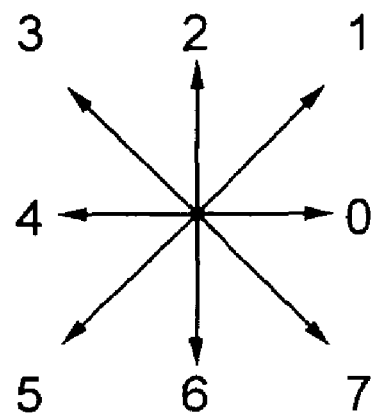
FIG. 24 is an illustration for explaining a Freeman's chain code.

Then, a template TP12 shown in FIG. 22 is prepared to carry out a pattern matching with respect to a binary coded SEM image (step S14) to extract vertices (step S15). At this time, the template TP12 had a degree of freedom with respect to rotation and scale and information about contrast (black and white) of the template TP12 was ignored to carry out a pattern matching. The results of such a pattern matching are shown in FIG. 23. In this figure, locations 58a through 58h shown by X are those which match with the template. To restrict the matching, it was extracted from the design data 162 (see FIG. 11) of the pattern how many vertices are in the pattern on the screen and whether the pattern is a closed curve.

Then, the extracted vertices are connected to each other by lines. At this time, the following restrictions were provided. That is:

1) the directions in which the lines are extended from the vertex shall be only two directions which are the same as the matched template;
2) only one of the lines crosses another line in one direction; and
3) extension of the line is stopped when the line crosses another line or when the line reaches the end of the screen.

Thus, the same first polygonal line PL2 as that in FIG. 17 was prepared (step S16).

The following method may be used for drawing lines between vertices. First, the graphic form of the pattern P22 to be inspected is read from the design data 162 or the like and is converted into, e.g., Freeman's chain code. The Freeman's chain code is used for a method for numbering each of directions for every 45 degrees to express the shape of a graphic form by numerical codes. For example, if the shape of the pattern P22 measured in this embodiment is expressed by a chain code clockwise from a location corresponding to the left-bottom vertex in FIG. 13, "20206484" is yielded. If the drawing of lines between extracted vertices is carried out in accordance with this code, the same polygonal line PL2 as that in FIG. 17 can be prepared.

Thereafter, the corners of the polygonal line PL2 are cut out similar to the above described eighth embodiment (step S17) and an edge searching direction is calculated in a direction perpendicular to the cut-out polygonal line PL4 (step 18). The edge searching direction was determined on the basis of whether contrast (black and white) is coincident with or opposite to the template during the matching. That is, in the case of the template TP12 shown in FIG. 22, the edge search was carried out inwardly from the outside of the broke line if contrast is coincident therewith, and outwardly from the inside of the polygonal line if contrast is opposite thereto.

Thereafter, similar to the eighth embodiment, the contour of the pattern edge is extracted (step S19) and the shape of the pattern to be inspected is measured (step S20) to output the results of inspection.

Figure 25:
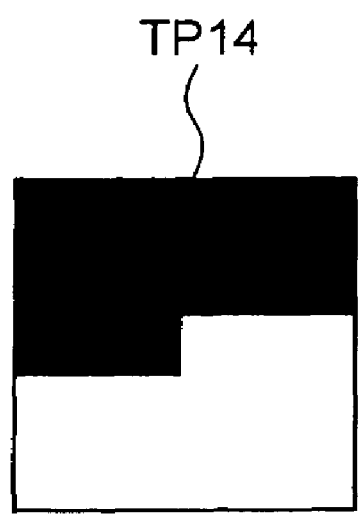
FIG. 25 is a diagram showing another example of a template for use in the pattern inspecting method shown in FIG. 21.

While the template TP12 shown in FIG. 22 has been prepared in this embodiment, another template, e.g., TP14 shown in FIG. 25 may be used. While the binary coding has been used as the pre-processing for the matching with the template, it is not always required to use this processing if the matching can be stably carried out, or another processing, such as the use of a noise removing filter, may be added.

(12) Tenth Embodiment of Pattern Inspecting Method

Figure 26:
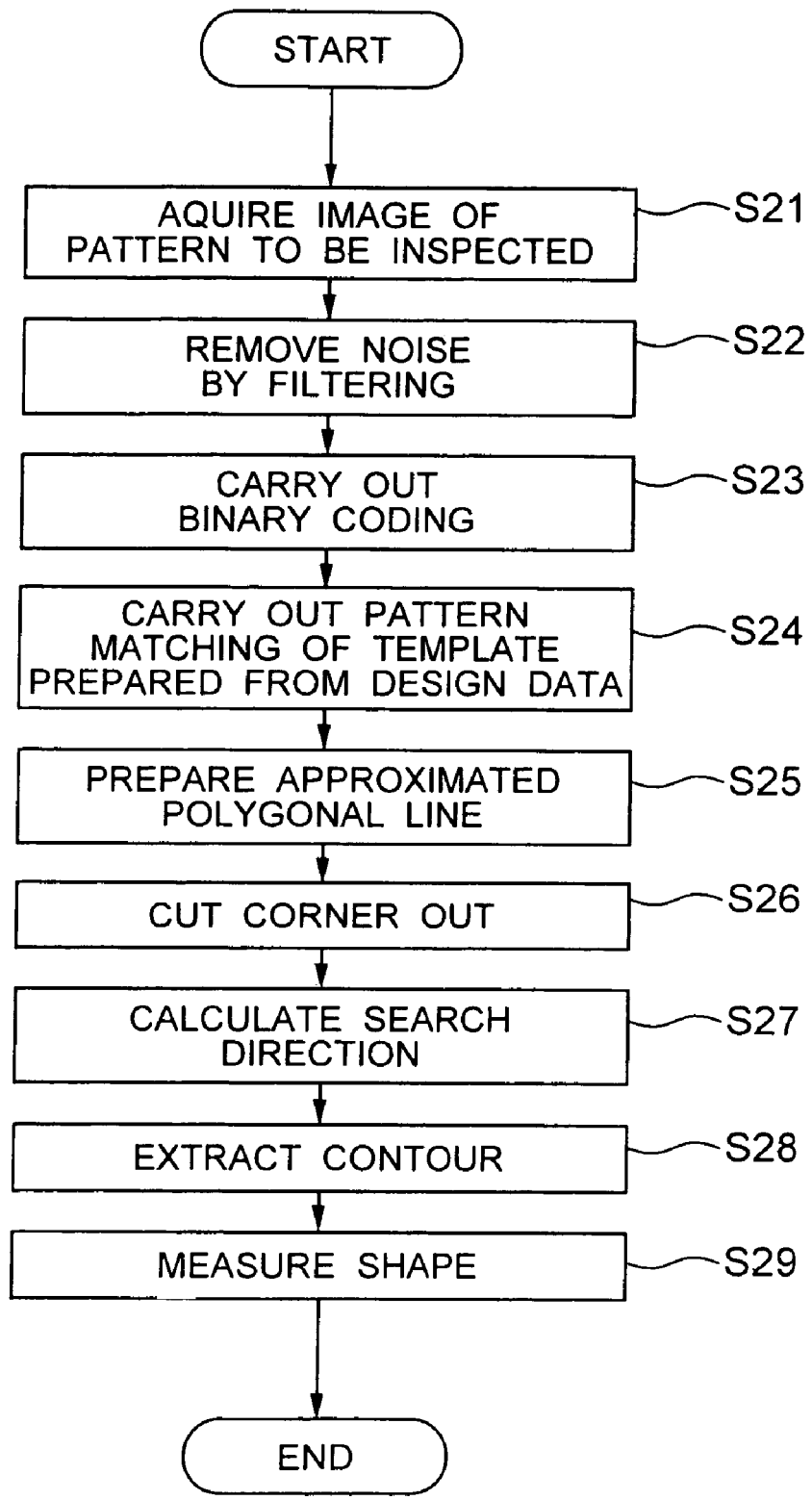
FIG. 26 is a flow chart for explaining a tenth embodiment of a pattern inspecting method according to the present invention.
Figure 27:
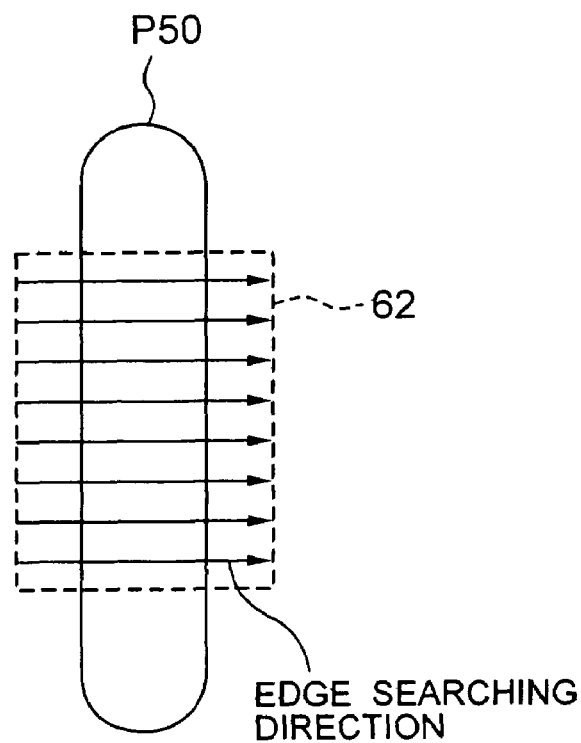
FIGS. 27 and 28 are schematic views for explaining a method for extracting pattern contour information in the prior art.
Figure 28:
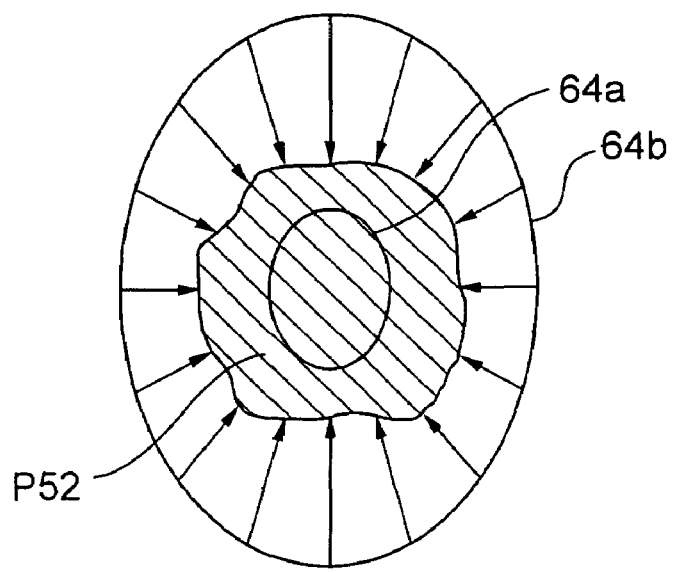

Referring to the accompanying drawings, the tenth embodiment of a pattern inspecting method according to the present invention will be described below. FIG. 26 is a flow chart showing the schematic procedure for carrying out a pattern inspecting method in this embodiment. Also in this embodiment, the pattern P22 shown in FIG. 13 is used as a pattern to be inspected.

First, similar to the above described eighth and ninth embodiments, a sample wherein a fine pattern is formed is carried in a sample chamber of the SEM unit 110, the stage 114 is operated to acquire a SEM image of the pattern P22 to be inspected, noises are removed and a binary coding is carry out (steps S21 through S23).

Then, the design data and plotting data of the pattern P22 are utilized for preparing a pattern matching template as follows.

First, data of coordinates of vertices are read from the design data incorporated in the pattern P22 to be inspected, and a pattern matching template is prepared on the basis of the data of the coordinates of vertices.

Alternatively, the above described design data may be previously converted into the coordinates of the origin of the pattern and into shape data expressed by a chain code or the like and a matching template may be sequentially prepared by reading the shape data at the same position as the position coordinate of the pattern P22 during inspection.

In any one of the above described two methods, the template is prepared as a black and white binary image on the basis of information regarding which portion is the remaining portion of the pattern or which portion is a hollowed-out portion. If the operator knows the shape of the pattern P22 to be inspected, the above described template may be prepared as a black and white binary image.

Thereafter, a series of processes including pattern matching (step S24), preparation of an approximated polygonal line shape (step S25), cutting-out of corners (step S26), calculation of an edge searching direction (step S27), extraction of a contour (step S28) and measurement of shape (step S29) are carried out similar to the above described eighth and ninth embodiments.

In the above described eighth through tenth embodiments, the results of matching of the searching direction with the shape of the original polygonal line may be displayed on the display with the binary coded pattern image. That is, a cut-out amount setting button is previously set so as to be displayed on, e.g., the display screen 210 of the display unit 126, so that the operator can suitably adjust the cut-out amount. During measurement, the polygonal line before cutting-out may be displayed with the pattern image, and this polygonal line may be deformed so as to be superimposed on the pattern image in accordance with the cut-out amount set by the operator. Thus, the operator can look at this polygonal line to determine whether the set cut-out amount is valid. If it is not valid, the operator can newly reset the cut-out amount.

(13) Program and Recorded Medium

In the above described embodiments, the series of procedures for carrying out the graphic contour extracting method and/or the pattern inspecting method have been stored in the memory MR2 as a recipe file to be carried out by the image processing unit 130 or 150 of the pattern inspecting system 100 or 120, respectively.

However, the above described series of procedures for carrying out the graphic contour extracting method and/or the pattern inspecting method may be incorporated into a program to be read by a general purpose computer to be carried out. Thus, a graphic contour extracting method and/or a pattern inspecting method according to an embodiment of the present invention can be realized by using the outside general purpose server or stand-alone type general purpose computer. In addition, the above described series of procedures for carrying out the graphic contour extracting method and/or the pattern inspecting method may be stored as a program, which is executed by a computer, in a recordable medium, such as a flexible disk or a CD-ROM, to be read by a computer capable of carrying out image processing and to be carried out by incorporating image data of an pattern to be inspected from a SEM.

The recorded medium should not be limited to a portable medium, such as a magnetic disk or an optical disk, but it may be a fixed recorded medium, such as a hard disk unit or a memory. In addition, a program including the above described series of procedures for carrying out the graphic contour extracting method and/or the pattern inspecting method may be distributed via a communication line (including radio communication), such as Internet. Moreover, the program including the above described series of procedures for carrying out the graphic contour extracting method and/or the pattern inspecting method may be enciphered, modulated or compressed to be distributed via wire or radio communication, such as Internet, or to be stored in a recordable medium to be distributed.

While the embodiments of the present invention have been described above, the present invention should not be limited to the above described embodiments. Of course, the present invention can be modified in various ways without departing from the principle of the invention. For example, while the image data have been acquired from the SEM unit in the pattern inspecting method in the above described embodiments, the present invention should not be limited thereto, but a pattern inspecting method according to the present invention can be applied to a pattern image obtained by an optical microscope or another scanning probe microscope.

What is claimed is:

1. A graphic contour extracting method comprising:
   acquiring an image of a graphical form to be inspected;
   defining a potential function V for the image of the graphical form;
   calculating a first group of curves which are formed by connecting equal values with respect to values expressed by said potential function V;
   calculating a second group of curves which are substantially perpendicular to said first group of curves; and
   searching a contour of the graphical form along said second group of curves to acquire contour information of the graphical form.

2. A graphic contour extracting method according to claim 1, wherein defining of said potential function V includes expressing a plane of the image by a complex plane $z=x+iy$ to define said potential function V on the basis of a density value or RGB value of a pixel positioned at $z_i=x_i+iy_i$ as a potential function $V(z)$ at an arbitrary position z on the image so as to be a regular function;
   calculating said first group of curves includes calculating a function $W(z)$ which is led from the Cauchy-Riemann's relation with respect to said potential function $V(z)$; and
   calculating said second group of curves includes calculating a group of curves on the z plane on which W is a constant.

3. A pattern inspecting method comprising:
   acquiring an image of a pattern to be inspected;
   defining a potential function V for the image of the pattern;
   calculating a first group of curves which are formed by connecting equal values with respect to values expressed by said potential function V;
   calculating a second group of curves which are substantially perpendicular to said first group of curves; and
   searching a contour of the pattern along said second group of curves to acquire contour information of the pattern.

4. A pattern inspecting method according to claim 3, wherein defining of said potential function V includes expressing a plane of the image by a complex plane $z=x+iy$ to define said potential function V on the basis of a density value or RGB value of a pixel positioned at $z_i=x_i+iy_i$ as a potential function $V(z)$ at an arbitrary position z on the image so as to be a regular function;
   calculating said first group of curves includes calculating a function $W(z)$ which is led from the Cauchy-Riemann's relation with respect to said potential function $V(z)$; and
   calculating said second group of curves includes calculating a group of curves on the z plane on which W is a constant.

5. A computer readable medium to store a program which allows a computer to execute a graphic contour extracting method, said method comprising:
   acquiring an image of a graphical form to be inspected;
   defining a potential function V for the image of the graphical form;
   calculating a first group of curves which are formed by connecting equal values with respect to values expressed by said potential function V;
   calculating a second group of curves which are substantially perpendicular to said first group of curves; and
   searching a contour of the graphical form along said second group of curves to acquire contour information of the graphical form.

6. A computer readable medium to store a program which allows a computer to execute a pattern inspecting method, said method comprising:
   acquiring an image of a pattern to be inspected;
   defining a potential function V for the image of the pattern;
   calculating a first group of curves which are formed by connecting equal values with respect to values expressed by said potential function V;
   calculating a second group of curves which are substantially perpendicular to said first group of curves; and
   searching a contour of the pattern along said second group of curves to acquire contour information of the pattern.

7. A pattern inspecting system comprising:
   an image acquiring part which acquires an image of a pattern to be inspected;
   a calculating part which defines a potential function V for the image of the pattern, calculates a first group of curves which are formed by connecting equal values with respect to values expressed by said potential function V, and calculates a second group of curves which are substantially perpendicular to said first group of curves; and
   a contour extracting part which searches a contour of the pattern along said second group of curves to acquire contour information of the pattern.

8. A pattern inspecting system according to claim 7, wherein said calculating part expresses a plane of the image by a complex plane $z=x+iy$ to define said potential function V on the basis of a density value or RGB value of a pixel positioned at $z_i=x_i+iy_i$ as a potential function $V(z)$ at an arbitrary position z on the image so as to be a regular function,
   said first group of curves is a function $W(z)$ which is led from the Cauchy-Riemann's relation with respect to said potential function $V(z)$, and
   said second group of curves are a group of curves on the z plane on which W is a constant with respect to said function $W(z)$.

* * * * *